United States Patent
Kweon et al.

[11] Patent Number: 5,987,184
[45] Date of Patent: Nov. 16, 1999

[54] DEVICE FOR CODING/DECODING IMAGE INFORMATION

[76] Inventors: Ji-Heon Kweon, 90-156, Shillimbon-dong, Kwanak-ku, Seoul; Chel-Soo Park, 302 Daewon Villa, 492-18 Uman-dong, Paltal-ku, Suwon-si, Kyoungki-do; Hae Kwang Kim, 467-14, Kunja-dong, Kwangjin-ku, Seoul; Joo-Hee Moon, 602-304 Hyundai 3 Cha Apt, 610, Kuui 3-dong, Kwangjin-ku, Seoul, all of Rep. of Korea

[21] Appl. No.: 08/941,123
[22] Filed: Sep. 30, 1997
[30] Foreign Application Priority Data Sep. 30, 1996 [KR] Rep. of Korea ............... 96-43056
Jul. 19, 1997 [KR] Rep. of Korea ............... 97-33832

[51] Int. Cl.$^6$ .......................................... G06K 9/00
[52] U.S. Cl. ........................................ 382/250; 382/236
[58] Field of Search ........................... 382/232, 233, 382/234, 235, 236, 238, 239, 240, 241, 242, 243, 244, 245, 246, 248, 250, 251, 252, 253; 341/67; 348/404, 384, 394, 395, 416, 700, 405; 358/432, 433

[56] References Cited

U.S. PATENT DOCUMENTS

| 5,333,012 | 7/1994 | Singhal et al. | 348/405 |
| 5,497,153 | 3/1996 | Jeong | 341/67 |
| 5,513,273 | 4/1996 | Ito | 382/248 |
| 5,602,549 | 2/1997 | Jeong | 341/67 |
| 5,729,633 | 3/1998 | Watanabe et al. | 382/239 |
| 5,748,789 | 5/1998 | Lee et al. | 382/243 |
| 5,778,100 | 7/1998 | Chen et al. | 382/243 |
| 5,801,975 | 9/1998 | Thayer et al. | 364/725.03 |
| 5,802,210 | 9/1998 | Kurata et al. | 382/250 |
| 5,881,175 | 3/1999 | Kim | 382/242 |

Primary Examiner—Bijan Tadayon

[57] ABSTRACT

A device for coding/decoding image information is provided to perform a boundary block merge of macro blocks of image information. Further, the DCT coefficients of a block are copied, if that is converted to an exterior block from a boundary block out of left-sided and upper-sided blocks for the purpose of performing a prediction of the DCT coefficients of the block's sub blocks. Thus, the efficiency of a coding/decoding process is enhanced.

24 Claims, 21 Drawing Sheets

FIG. 1
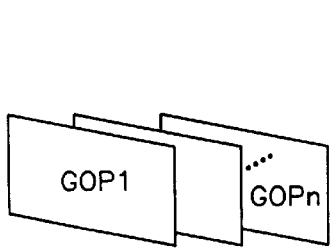
(A) Video sequence layer
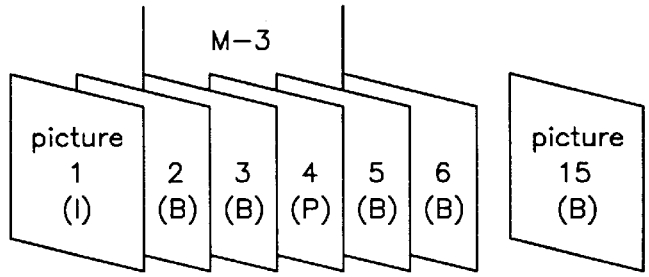
(B) GOP layer
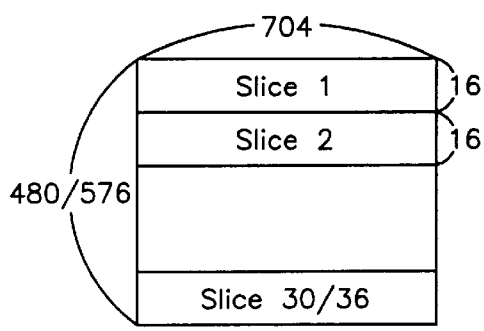
(C) Picture layer
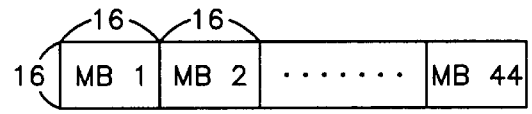
(D) Slice layer
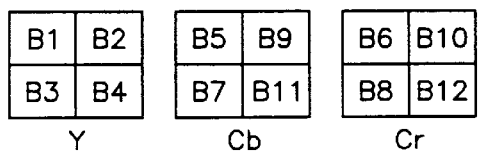
(E) MB layer
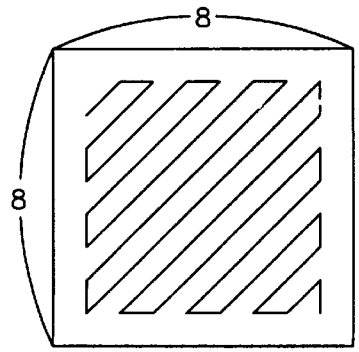
(F) Block layer

DEVICE FOR CODING/DECODING IMAGE INFORMATION

BACKGROUND OF THE INVENTION

1. Field of the Invention

The present invention relates to a device for coding/decoding image information and, more particularly, to a device for coding/decoding image information, which is derived to determine the DCT coefficients of a block that is converted to an exterior block from a boundary one during a boundary block merge by means of merged information, and to perform a prediction of the DCT coefficients of the peripheral blocks by using the determined DCT coefficients.

2. Discussion of Related Art

When each pixel of image signals is represented by digital data of predetermined bits (for example, 8-bit data, 16-bit data, etc.), information content becomes excessively increased to communicate through public networks, and great costs are required to send/receive the large information content by a network or store it in a memory such as CD-ROM, deteriorating image quality. It is thus necessary to compress image information so as to send/receive image information via the conventional networks with a cost reduction.

As shown in FIGS. 1A–1F, the image information, to be compressed, is divided into classes. A video sequence layer comprises a plurality of GOPs (Group of Pictures) (See. FIG. 1A) each of which has I, B, and P pictures (See. FIG. 1C). One picture has a plurality of slices (See. FIG. 1B). One slice has a plurality of macro blocks (See. FIG. 1D) each of which includes 16×16 pixels. Four luminance sub blocks B1–B4 and eight chrominance sub blocks B5–B12 make one macro block, and each sub block has 8×8 pixels.

FIG. 2 shows a picture of an object having a predetermined shape that is made up with macro blocks (16×16 pixels) to be used in an image coding. As shown in FIG. 2, the macro blocks are classified into three types: interior macro blocks 22 having only interior information of the object, exterior macro blocks 23 having no interior information, and boundary macro blocks 21 partly having interior information.

In an intra mode where an image coding technique is applied to the macro blocks in coding the source picture instead of error signals, the sub blocks (8×8) are transformed by a discrete cosine transformation, and DC coefficients are quantized and predicted. DC prediction may be accomplished by a no loss coding where the blocks and DPCMs are applied in zigzags, as shown in FIG. 3. The white block indicates an interior block, the gray one a boundary block, and the black one an exterior block.

To code a DC coefficient, the quantized DC coefficient DC_B4 of the sub block B4 of the macro block MB1 that is adjacent to the sub block B of the macro block MB2 to be coded is defined as the predicted value DC_P of the sub block B of the macro block MB2.

As shown in FIG. 4, with respect to a block X to be coded, the previous block A, the left upper-sided block B, and the upper-sided block C are designated. The absolute value of the vertical gradient for the DC coefficients of the previous and left upper-sided blocks A and B is compared with that of the horizontal gradient for the DC coefficients of the left upper-sided and upper-sided blocks B and C. If the former is less than the latter, the DC coefficient of the previous block A is defined as a DC pre-estimated value that will be used to code the DC coefficient of the current block X. If the former is larger than the latter, the DC coefficient of the upper-sided block C is used as a DC pre-estimated value for coding the DC coefficient of the current block X. The differential, to be coded, can be obtained by subtracting the DC pre-estimated value from the DC coefficient of the current block X.

As shown in FIG. 5, in order to pre-estimate an AC coefficient, the first row coefficient (from the upper-sided block C) or the first column coefficient (from the left-sided block A) of the previous block, determined in the same direction as the DC prediction in FIG. 4, is used as the first row or column coefficient of the current block X in a differential coding.

During the prediction of DC and AC coefficients as described above, the sub blocks positioned inside the object or on the boundary of the object in a macro block can be scanned and predicted, while those out of the object cannot be coded.

As shown in FIG. 6, each boundary macro block has three types of sub blocks, interior sub blocks 61, exterior sub blocks 63, and boundary sub blocks 62. Two boundary sub blocks 62 and 64 can be merged so as to enhance a coding efficiency.

However, after a BBM (Boundary Block Merge) technique, the boundary sub block 4 as shown in FIG. 7A becomes the exterior sub block in FIG. 7B.

With the BBM technique and prediction of DC and AC coefficients, there is no appropriate treatment for the sub blocks transformed from boundary sub blocks to exterior sub blocks. If these sub blocks are treated as boundary sub blocks, they will require an unnecessary process for discrete cosine transformation and cause a deterioration of image quality as well as data errors during a data transmission.

SUMMARY OF THE INVENTION

Accordingly, the present invention is directed to a device for coding/decoding image information that substantially obviates one or more of the problems due to limitations and disadvantages of the related art.

An object of the present invention is to provide a device for coding/decoding image information which is derived to perform a boundary block merge of the macro blocks of the image information and copy the DCT coefficients of a block that is converted to an exterior block from a boundary one out of left-sided and upper-sided blocks for the purpose of performing a prediction of the DCT coefficients of the block's sub blocks.

Another object of the present invention is to provide a device for coding/decoding image information by determining the DCT coefficients of a block that is converted to an exterior block from a boundary one during a boundary block merge by means of merged information, and performing a prediction of the DCT coefficients of the peripheral blocks by using the determined DCT coefficients.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the image signal coding section of a device for coding image information comprises: a boundary block merging section for receiving the image signal, comparing pixel values corresponding to the respective blocks so as to determine whether the block received is a boundary block, and performing a boundary block merge; a discrete cosine transformer for performing a discrete cosine transformation of the image signal received; a quantizing section for quantizing the transformed coefficient received from the discrete cosine transformer; a transformed coefficient and coded block pattern coding section for receiving the transformed coefficient from the quantizing section and merged information from the boundary block merging section, comparing pixel values corresponding to the respective blocks, and generating texture information; an inverse quantizing section for inverse-quantizing the transformed coefficient quantized by the quantizing section, and extracting the transformed coefficient; an inverse discrete cosine transformer for performing an inverse discrete cosine transformation of the transformed coefficient received from the inverse quantizing section; and a boundary block split section for receiving the image signal from the inverse discrete cosine transformer and the merged information from the boundary block merging section, and generating decoded data.

The image signal coding section of the device for coding image information comprises: a boundary block padding section for receiving the image signal and the original shape information, and replacing the background part of the sub blocks with the mean value of the object part; a boundary block merging section for receiving the image signal and the reconstructed shape information from the boundary block padding section, and performing a boundary block merge; a discrete cosine transformer for performing a discrete cosine transformation of the image signal received from the boundary block merging section; a quantizing section for quantizing the transformed coefficient received from the discrete cosine transformer; a transformed coefficient and coded block pattern coding section for receiving the transformed coefficient quantized by the quantizing section and merged information transferred from the boundary block merging section, and selectively coding texture information; an inverse quantizing section for inverse-quantizing the transformed coefficient quantized by the quantizing section, and extracting the transformed coefficient; an inverse discrete cosine transformer for performing an inverse discrete cosine transformation of the transformed coefficient received from the inverse quantizing section; and a boundary block split section for receiving the image signal from the inverse discrete cosine transformer and the reconstructed shape information, and generating decoded data.

A device for decoding an image signal comprises: a transformed coefficient and coded block pattern decoding section for receiving the image information from the demultiplexer, comparing pixel values corresponding to the respective blocks so as to determine whether the block received is a boundary block, and performing a boundary block division and a prediction to decode the image information; an inverse quantizing section for multiplying the image information, decoded by the transformed coefficient and coded block pattern decoding section, by the quantized coefficient; an inverse discrete cosine transformer for inverse-transforming the transformed coefficient inverse-quantized by the inverse quantizing section, and generating it as image data in a space region; and a boundary block split section for receiving the image signal from the inverse discrete cosine transformer, and generating image data in the units of a macro block.

In an embodiment of a method of coding/decoding image information, after a boundary block merge, the block converted to an exterior block is not predicted but the block containing the signal merged by the boundary block merge is DCT-transformed to perform a DC prediction.

In another embodiment, when a boundary block merge and an AC/DC predictive coding are performed, the block converted to an exterior block from a boundary one is considered as an exterior block and has a predetermined value for DC and AC components of the block for the purpose of the AC/DC prediction.

In another embodiment, if the merged information indicates that the current sub block is an exterior sub block converted from a boundary one by a boundary block merge, the quantized DCT coefficients (DC and AC coefficients) of the merged blocks are copied into the current sub block.

In another embodiment, if the merged information indicates that the current sub block is an exterior sub block converted from a boundary one by a boundary block merge, instead of a DCT coding as in the case of exterior blocks, the DC coefficient is set to $2^{(bits\ per\ pixel-1)}$ (where bits per pixel is the number of bits indicating the pulse code modulation data of one pixel) and the AC coefficient is set to 0.

In another embodiment, if the merged information indicates that the current sub block is an exterior sub block converted from a boundary one by a boundary block merge, instead of a DCT coding as in the case of exterior blocks, a prediction is performed by copying the AC and DC coefficients of a block, which is not an exterior block out of left-sided and upper-sided blocks, into the current sub block.

In still another embodiment, if the merged information indicates that the current sub block is an exterior sub block converted from a boundary one by a boundary block merge, a prediction is performed by copying the quantized DC coefficient of the merged block into the current sub block and setting the AC coefficient to 0.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 1A–1F illustrate a multi-stepped structure of an image signal;

DETAILED DESCRIPTION OF PREFERRED EMBODIMENT

Reference will now be made in detail to the preferred embodiments of the present invention, examples of which are illustrated in the accompanying drawings.

Figure 8:
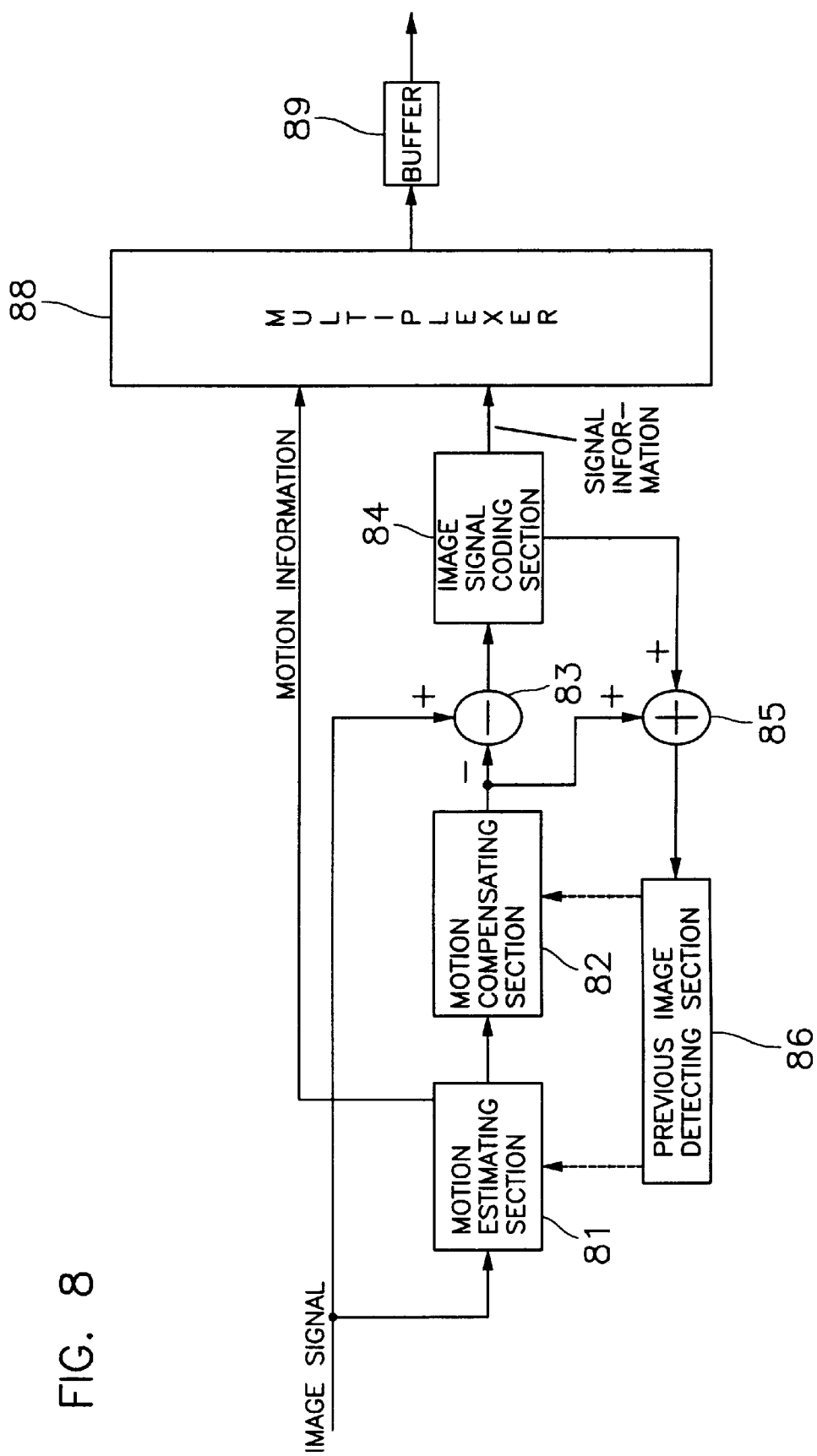
FIG. 8 is a block diagram of a first embodiment of an image encoder according to the present invention.

FIG. 8 is a block diagram of a picture encoder in accordance with a preferred embodiment of the present invention.

Object image signals generated by a camera (not shown) are fed into a motion estimating section 81 in the units of a macro block. Motion information of the macro blocks, estimated by the motion estimating section 81 are compensated by a motion compensating section 82. A subtractor 83 detects the difference between the motion-compensated image signals and object image signals transferred in the units of a macro block.

The output of the subtractor 83 is transmitted to an image signal coding section 84 for coding the object image signal in the units of a sub block. For example, the image signal coding section 84 divides one macro block into 8×8 sub blocks having 8 pixels along each of the X and Y axes of the macro block before the image signal is coded.

An adder 85 detects the sum of the image signal in macro block unit motion-compensated by the motion compensating section 82 and interior information coded by the image signal coding section. The output of the adder 85 is transmitted to a previous image detecting section 86 for detecting the previous image signals. The image of the previous macro block detected by the previous image detecting section 86 is used in the motion estimation and compensation performed by the motion estimating section 81 and the motion compensating section 82.

The motion information estimated by the motion estimating section 81 and the interior information coded by the image signal coding section 84 are multiplexed by a multiplexer 88 and transmitted as a bit stream by a buffer 89.

Figure 9:
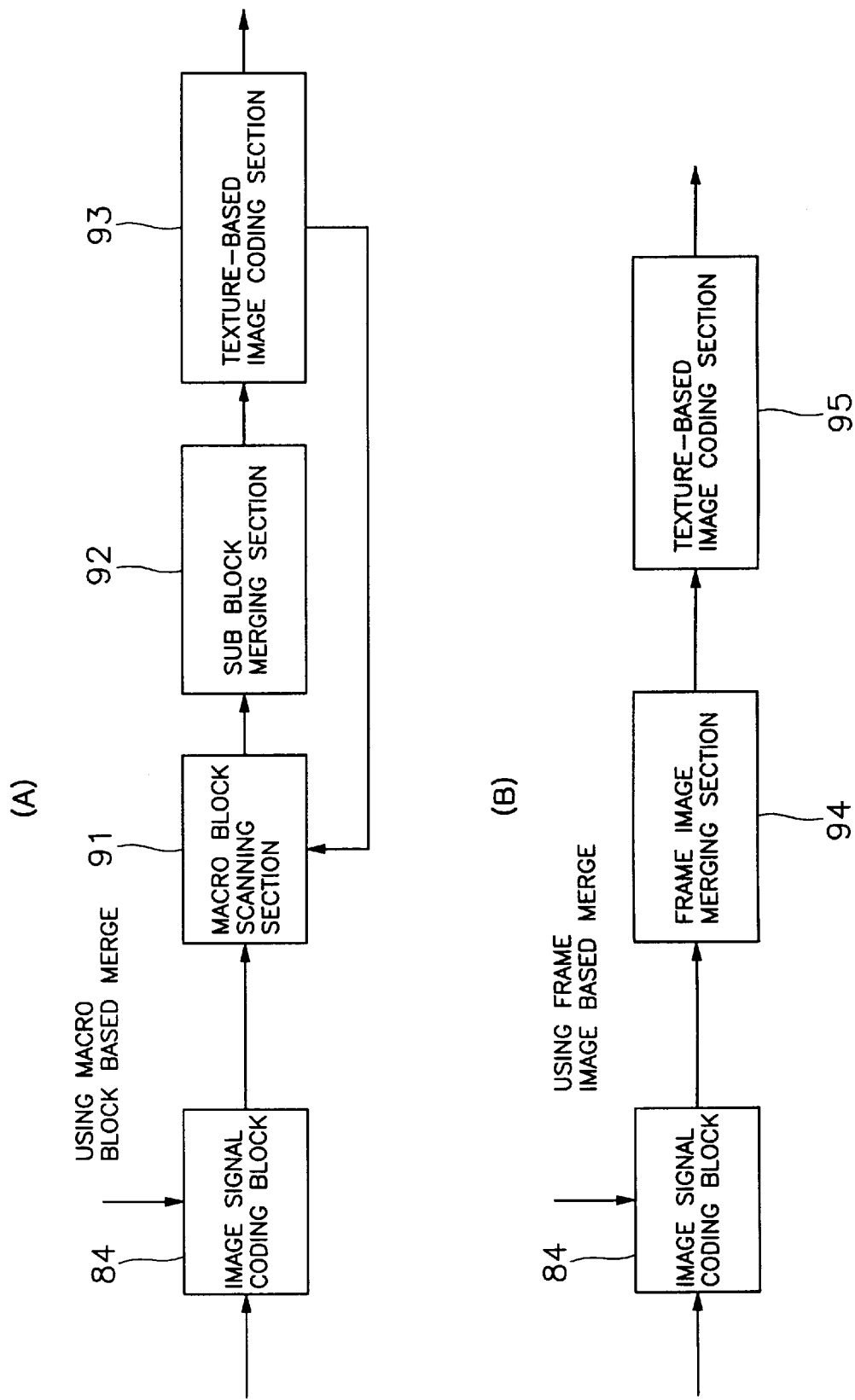
FIG. 9A is a block diagram of a first embodiment of an image signal coding section according to the present invention.
FIG. 9B is a block diagram of a second embodiment of an image signal coding section according to the present invention.

FIG. 9A is a block diagram of a first embodiment of the image signal coding section 84, which is constructed to code image signals after macro blocks are merged by a BBM technique.

Referring to FIG. 9A, the image signal coding section 84 comprises a macro block scanning section 91 for scanning the macro blocks in the units of a sub block, a sub block merging section 92 for merging the sub blocks that are scanned by the macro block scanning section 91 and satisfy the requirements for a merge, and a texture-based image coding section 93 for coding the sub blocks merged by the sub block merging section 92.

Figure 7:
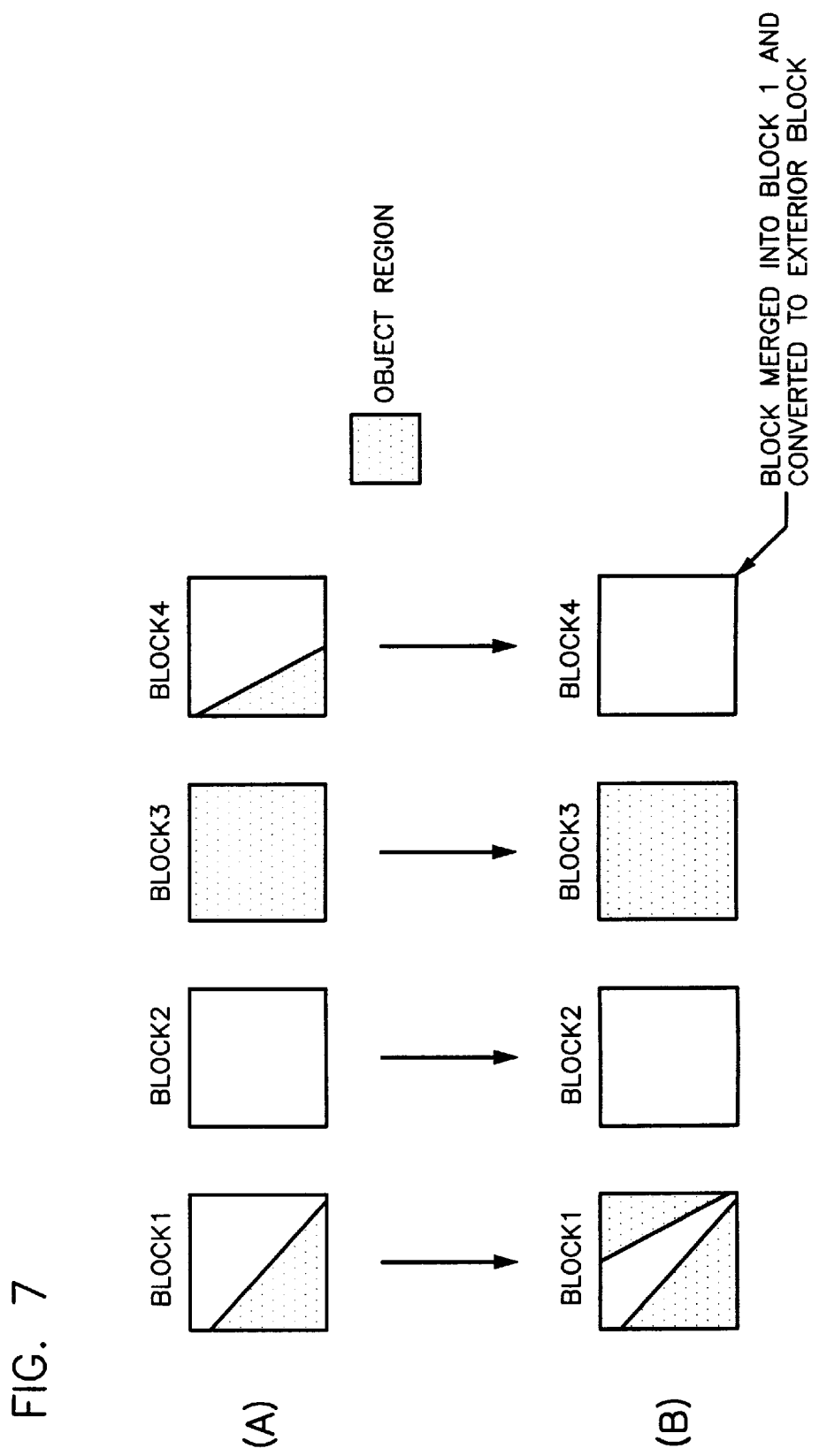
FIG. 7A illustrates a sub block before a boundary block merge.
FIG. 7B illustrates that sub block 4 is converted to a boundary block by a boundary block merge.

The requirements for a merge are described below with reference to FIGS. 7A and 7B. The macro block scanning section 91 divides a macro block into blocks 1 to 4, scanning the respective sub blocks and storing the profile information of an object. For example, the profile information is set to "0" when each pixel value is smaller than a threshold and "1" when the former is larger than the latter. The sub block merging section 92 searches for boundary blocks by means of the stored profile information and compares the profile information of the corresponding coordinates between the respective boundary blocks, performing a merging process. When the blocks 1 and 4 are boundary blocks and there is no pixel overlapped between the block 4 rotated in a 180-degree arc and the block 1, the object and profile information after the block 4 is rotated is merged into the block 1 so that the block 4 becomes a exterior block, as shown in FIG. 7B. Thus merged blocks are coded by the texture-based image coding section 93.

FIG. 9B is a block diagram of a second embodiment of the image signal coding section 84, which is constructed to code image signals by performing a merge over the frame image without restriction on the macro blocks as in the independent coding mode of motion and image information.

Referring to FIG. 9B, the image signal coding section 84 comprises a frame image merging section 94 for merging the interior blocks of the frame image, and a texture-based image coding section 95 for coding the image merged by the frame image merging section 94.

DC and AC coefficients are predicted by the image signal coding section 84, and the merged signals and blocks instead of the existing image signals are received during a boundary block merge.

Figure 10:
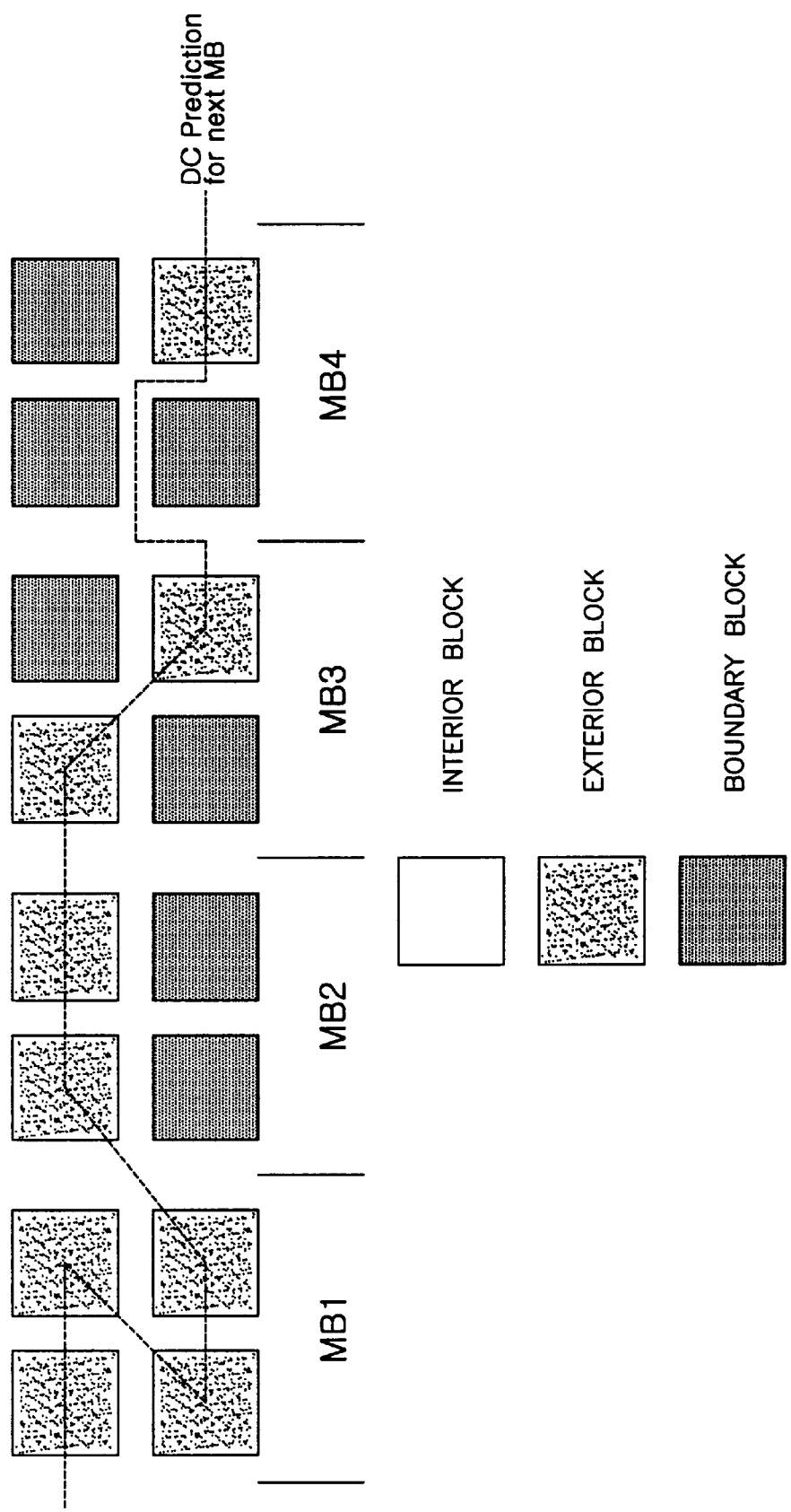
FIG. 10 illustrates a scanning to predict DC and AC coefficients after a boundary block merge.

FIG. 10 illustrates a scanning method when DC and AC coefficients are predicted after the boundary block merge, where the white block indicates an interior block, the gray one a boundary block, and the black one an exterior block. As shown in FIG. 10, the fourth block in the macro block MB2 is changed into an exterior block from a boundary block in FIG. 3, and it is not predicted as indicated by the dotted line.

Figure 11:
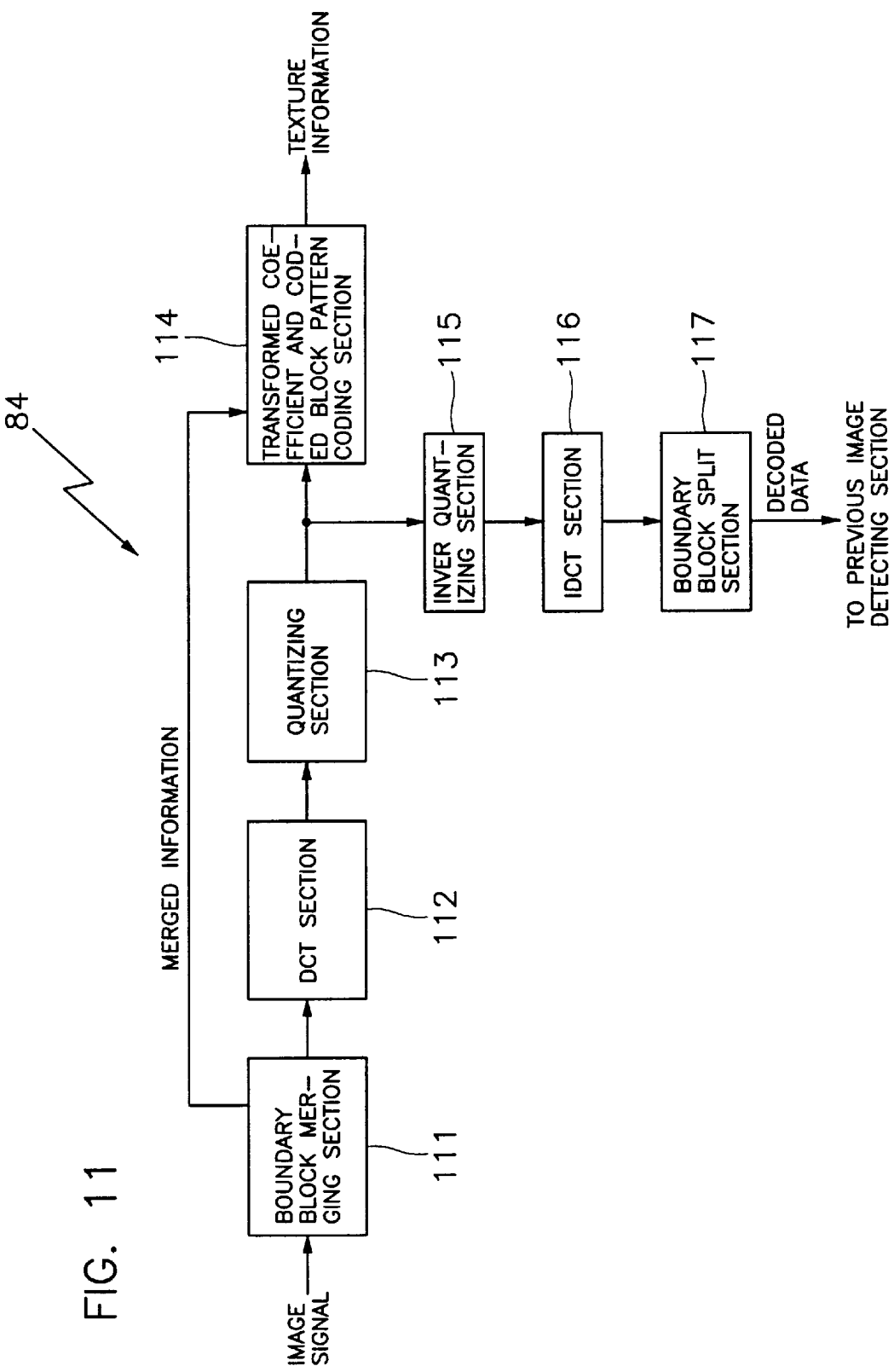
FIG. 11 is a block diagram of a third embodiment of an image signal coding section to predict DC and AC coefficients after a boundary block merge.

FIG. 11 is a block diagram of a third embodiment of an image signal coding section, which predicts the DC and AC coefficients after a merge process.

Referring to FIG. 11, the image signal coding section 84 comprises: a boundary block merging section 111 for comparing the pixel values corresponding to the respective sub blocks of an image signal received, determining whether the sub blocks are boundary blocks or not, and merging the boundary blocks; a discrete cosine transformer 112 for performing a discrete cosine transformation of the merged image signal transferred from the boundary block merging section 111; a quantizing section 113 for quantizing the transformed coefficient received from the discrete cosine transformer 112; a transformed coefficient and block pattern coding section 114 for receiving the transformed coefficient quantized by the quantizing section 113 and texture information from the boundary block merging section 111 to code texture information; an inverse quantizing section 115 for inverse-quantizing the transformed coefficient quantized by the quantizing section 113, and extracting the transformed coefficient; an inverse discrete cosine transformer 116 for performing an inverse discrete cosine transformation of the transformed coefficient received from the inverse quantizing section 115; and a boundary block split section for decoding the image signal transferred from the inverse discrete cosine transformer 116 and the merged information from the boundary block merging section 111.

Figure 12:
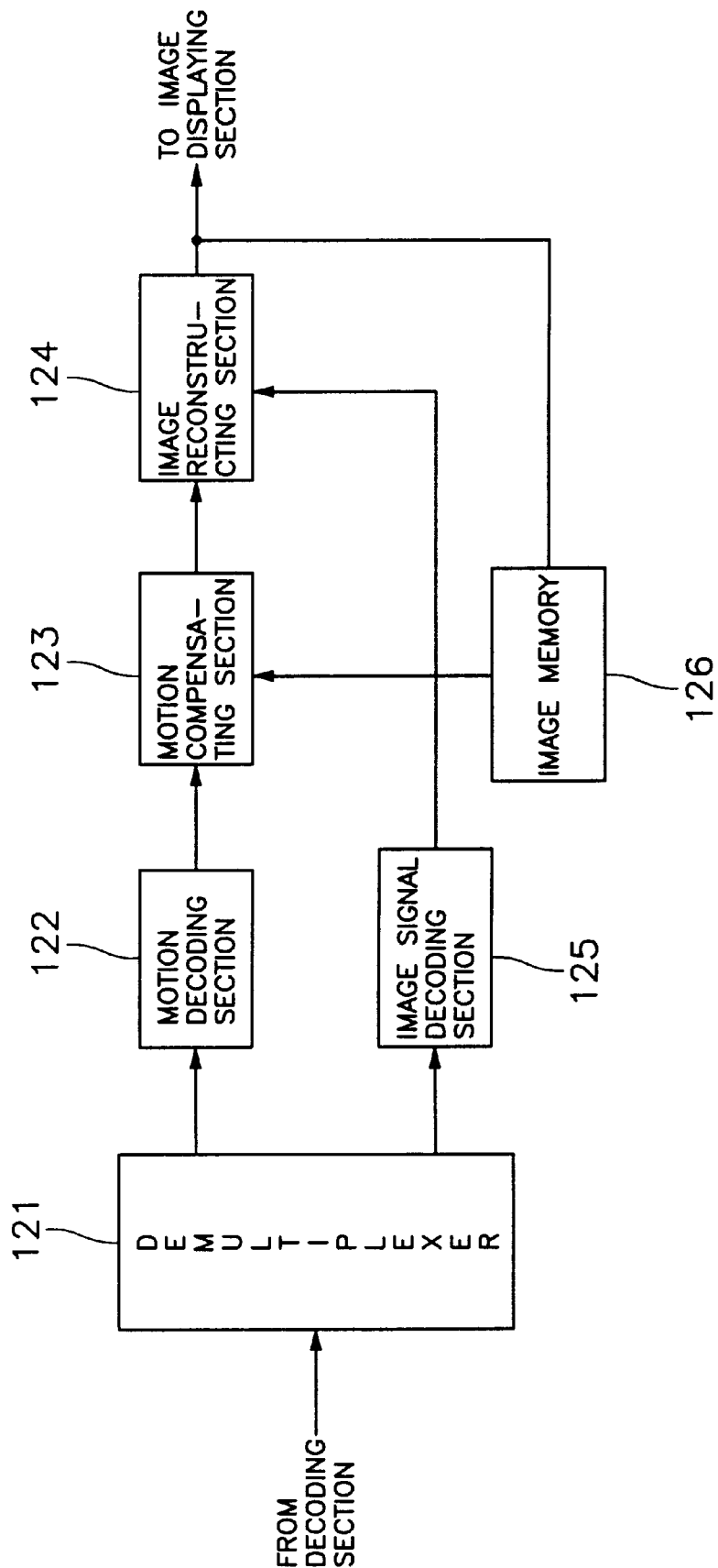
FIG. 12 is a block diagram of an image decoder according to the present invention.

FIG. 12 is a block diagram of a picture decoder in accordance with the present invention.

Referring to FIG. 12, the multiplexed image and motion information transferred from a coding section is divided by a demultiplexer 121. The motion information generated by the demultiplexer 121 is detected by a motion decoding section 122 and the image information is transferred into an image decoding section 125. The image decoding section 125 compares the pixel values corresponding to the respective blocks in order to determine whether the block is a boundary block or not, and performs a boundary block merge and a prediction, decoding the image signal. As shown in FIGS. 7A–7B, the image decoding section 125 divides the macro block into blocks 1–4 and compares the pixel values corresponding to the respective sub blocks, searching and dividing the boundary blocks. When the blocks 1 and 4 are boundary blocks and there is no pixels overlapped between the block 4 rotated in a 180-degree arc and the block 1, the image decoding section 125 divides object and shape information of the rotated block 4 out of the block 1, and rotates the divided information in a 180-degree arc, reconstructing the block 4. The divisions between the blocks 1 and 2, the blocks 1 and 3, the blocks 2 and 3, the blocks 2 and 4, and the blocks 3 and 4 are accomplished in the same manner. The motion compensating section 123 motion-compensates the motion information detected by the motion decoding section 122 and the image data received from an image memory 126. An image reconstructing section 124 receives the motion-compensated information from the motion compensating section 123 and the image signal from the image decoding section 125, reconstructing the image and transferring it to a display (i.e., monitor, television, etc.).

Figure 13:
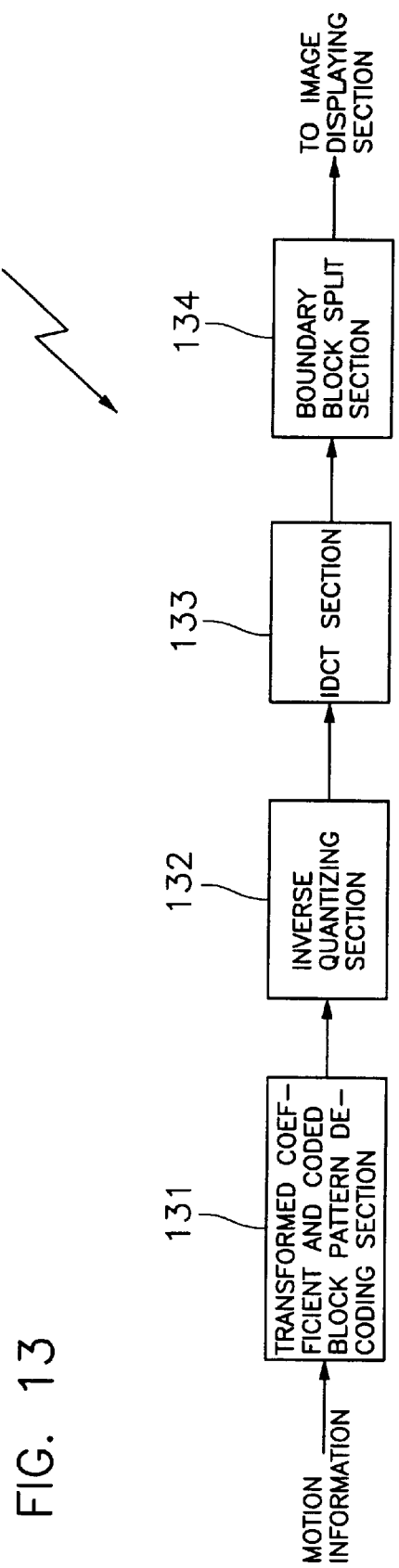
FIG. 13 is a block diagram of an image signal reconstructing section of an image decoder for decoding a coded image information by a boundary block merge and a prediction.

FIG. 13 is a block diagram of the image signal decoding section of a decoder for decoding image information coded by a merge and prediction.

Referring to FIG. 13, a transformed coefficient and coded block pattern decoding section 131 receives the decoded image information from the demultiplexer 121, compares the pixel values corresponding to the respective blocks to determine whether the blocks are boundary blocks or not, decoding the boundary blocks by a boundary block merge, and performs a prediction, decoding the image information. An inverse quantizing section 132 multiplies the image information decoded by the transformed coefficient and coded block pattern decoding section 131 by the quantized coefficient. An inverse discrete cosine transformer 133 inverse-transforms the inverse-quantized coefficient transferred from the inverse quantizing section 132, generating image data in a space region. A boundary block split section 134 receives the image signal from the inverse discrete cosine transformer 133 and generates the image data to a display (i.e., monitor, television, etc.).

In further another embodiment, the concept of a VOP (Video Object Plane) is used in the compression of image information as a unit block having designated shaped information.

The VOP is defined as a tetragon that includes object and background images divided from an input picture received. When the picture of an object has a predetermined object, or an object region comprising a predetermined region, the object image is divided into VOPs each of which will be coded.

Figure 2:
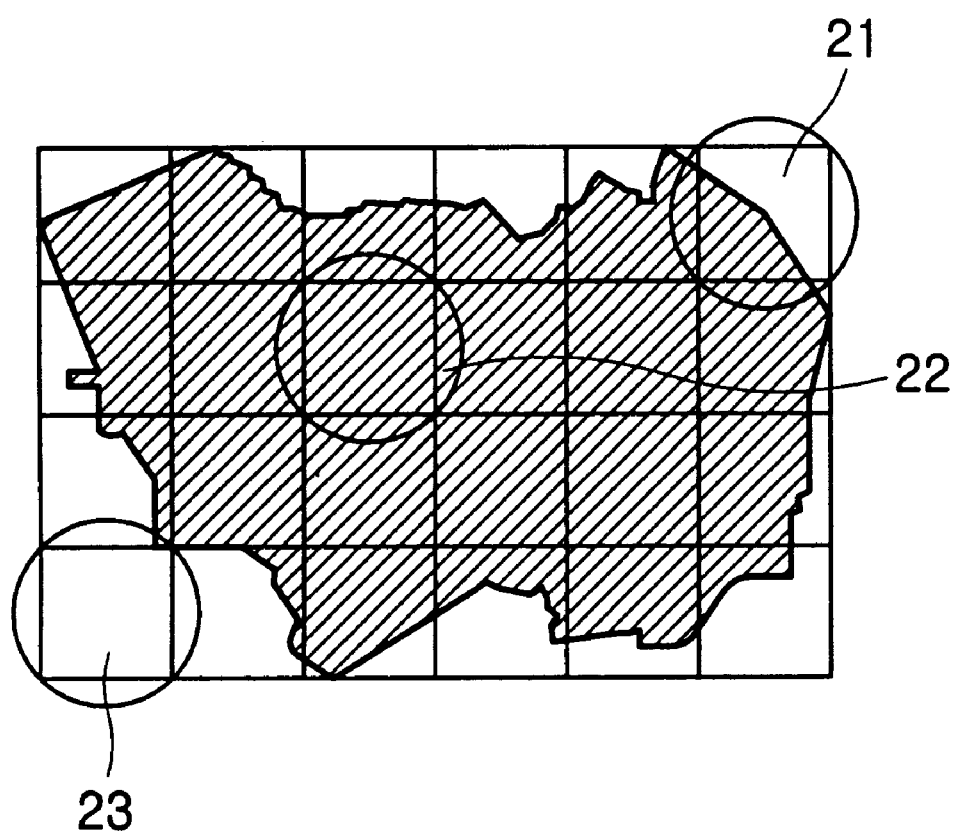
FIG. 2 illustrates an image having predetermined shape reconstructed with macro blocks (16×16 pixels) for the purpose of a coding.

FIG. 2 shows a VOP having predetermined shape that is reconstructed into macro blocks (16×16 pixels) for the purpose of an image coding. The macro blocks are classified into three types: interior macro blocks having only interior information, exterior macro blocks having no interior information, and boundary macro blocks partly having interior information.

Figure 6:
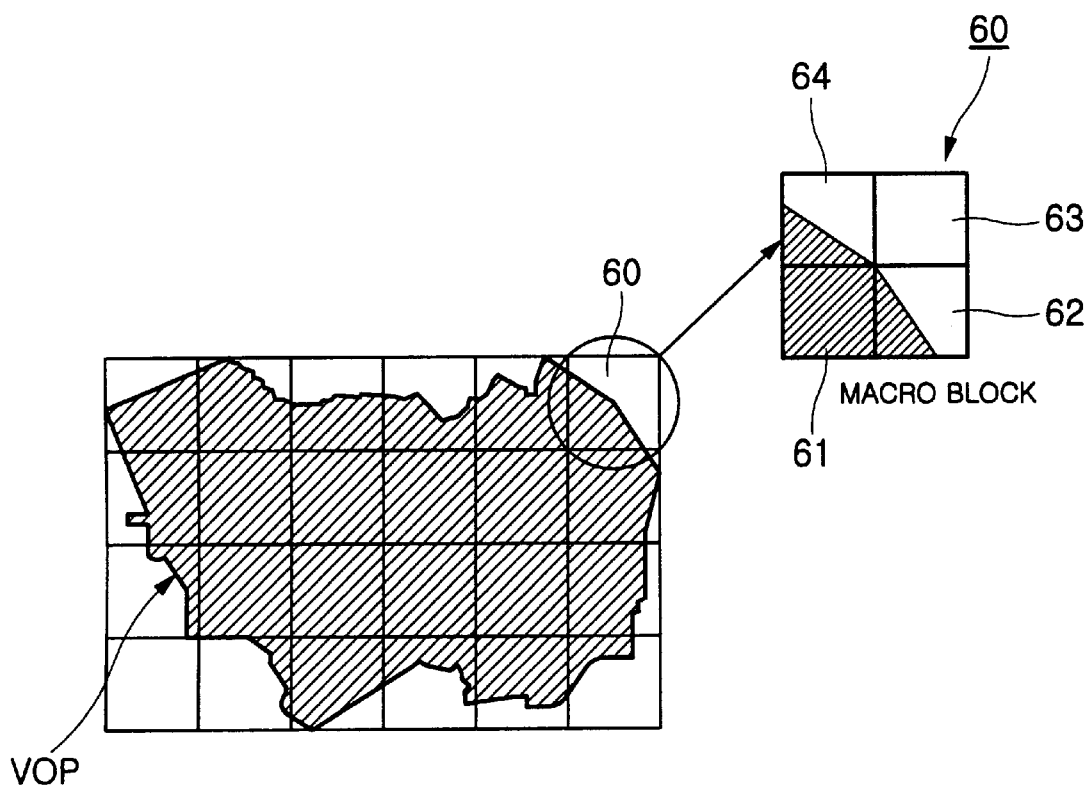
FIG. 6 illustrates the types of sub blocks in a macro block.

Each of the boundary macro blocks 21 constituting a VOP has three types of sub blocks, as shown in FIG. 6. Boundary sub blocks are merged in a coding process in order to attain a coding efficiency.

Figure 14:
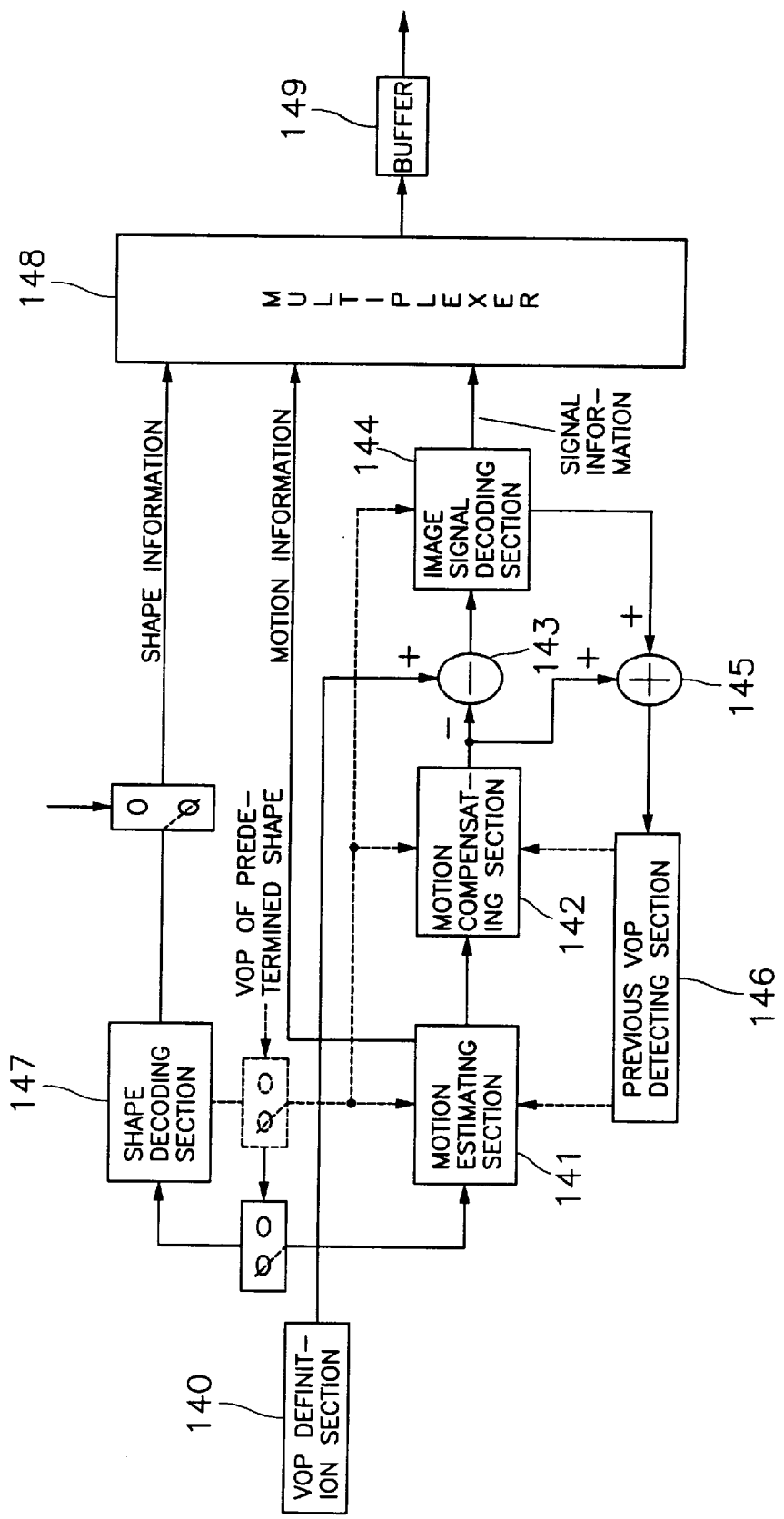
FIG. 14 is a block diagram of a VOP encoder according to the present invention.

FIG. 14 is a block diagram of a VOP coder according to the present invention.

Referring to FIG. 14, a motion estimating section 141 receives the respective VOPs of the object image defined by a VOP definition section 140, estimating them in the units of a macro block.

The motion information of the macro blocks estimated by the motion estimating section 141 is then compensated by a motion compensating section 142. A subtractor 143 detects a difference between the VOP in macro block unit transferred from the motion compensating section 142 and that is defined by the VOP definition section 140. An image signal coding section 144 receives the output of the subtractor 143 and the shape information transferred from a shape coding section 147, coding the object's image signal in the units of sub blocks by a boundary block merge and a DC and AC coefficients prediction.

An adder 145 generates the sum of the VOP in macro block unit motion-compensated by the motion compensating section 142 and the interior information coded by the image signal coding section 144, transmitting it to a previous VOP detecting section 146 for detecting the VOP of the previous picture. The previous picture detected by the previous VOP detecting section 146 is used by the motion estimating section 141 and the motion compensating section 142 for the purpose of motion estimation and compensation. The shape coding section 147 receives the VOP defined by the VOP definition section 140 so as to code shape information.

As indicated by dotted lines, the motion estimating section 141, the motion compensating section 142, and the image signal coding section 144 receives the output of the shape coding section 147 whose usage depends on the field where the VOP coding section is used, estimating and compensating the motion information, and coding the interior information.

The motion information estimated by the motion estimating section 141, the interior information coded by the image signal coding section 144, and the shape information coded by the shape coding section 147 are multiplexed by a multiplexer 148 and transmitted as a bit stream through a buffer 149.

The image signal coding section 144 predicts DC and AC coefficients according to the signals and blocks that are converted from the existing image signal by a boundary block merge.

Figure 15:
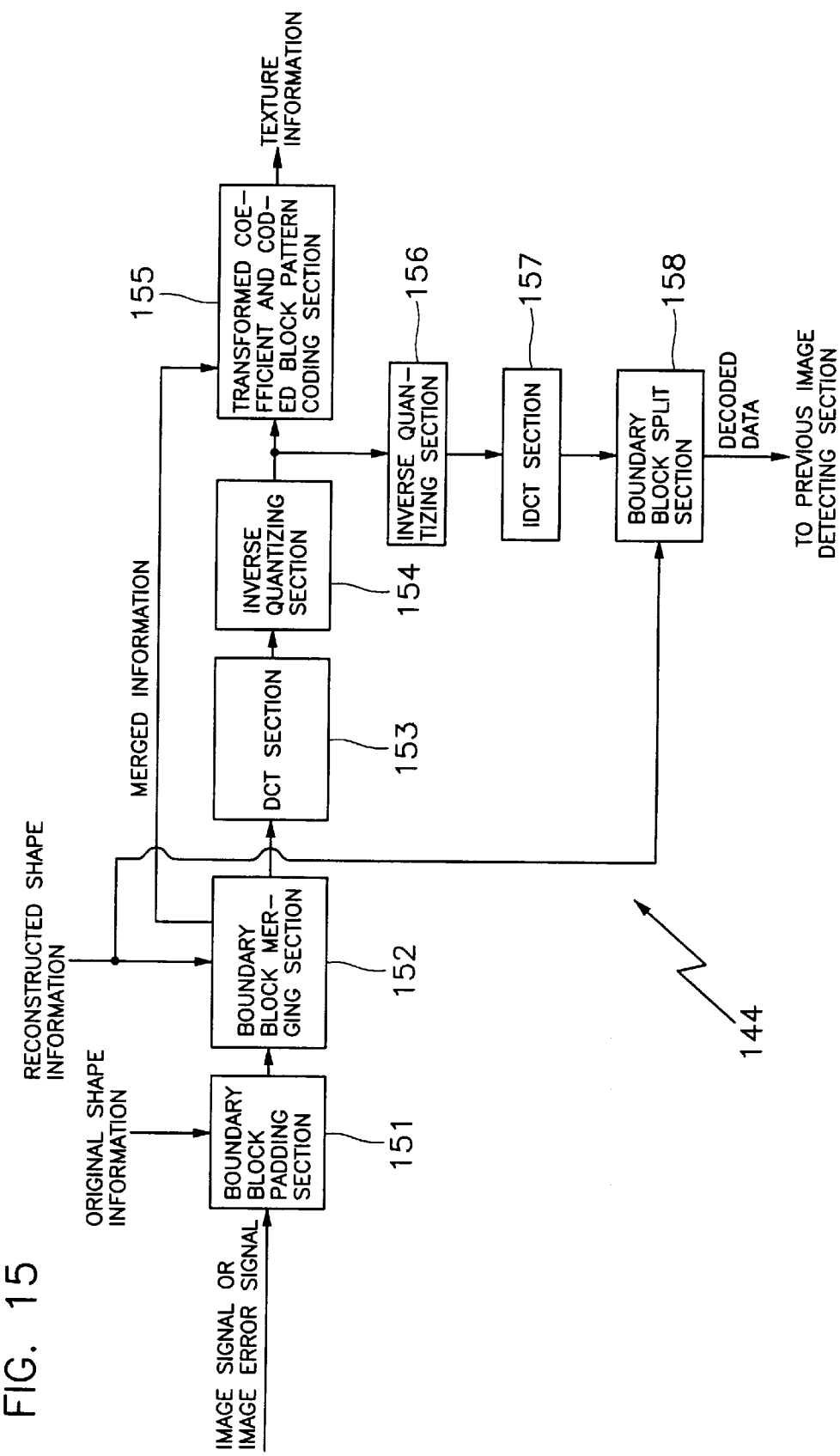
FIG. 15 is a block diagram of a fourth embodiment of an image signal coding section.

FIG. 15 is a block diagram of a fourth embodiment of an image signal coding section, which predicts the DC and AC coefficients after a merge process.

The image signal coding section 144 of the VOP coder according to the present invention comprises: a boundary block padding section 141 for receiving the image signal and the original shape information, and replacing the background part of sub blocks (8×8 blocks) with the mean value of the object part, followed by filtering, or setting the background part to "0"; a boundary block merging section 152 for receiving the image signal from the boundary block padding section 151 and the reconstructed shape information, and performing a boundary block merge; a discrete cosine transformer 153 for discrete-cosine-transforming the image signal transferred from the boundary block merging section 152; a quantizing section 154 for quantizing the transformed coefficient transferred from the discrete cosine transformer 153; a transformed coefficient and block pattern coding section 155 for receiving the transformed coefficient quantized by the quantizing section 154 and the merged information transferred from the boundary block merging section 152, coding texture information; an inverse quantizing section 156 for inverse-quantizing the transformed coefficient quantized by the quantizing section 154 and extracting the transformed coefficient; an inverse discrete cosine transformer 157 for inverse-discrete-cosine-transforming the transformed coefficient transferred from the inverse quantizing section 156; and a boundary block split section 158 for receiving the image signal from the inverse discrete cosine transformer 157 and the reconstructed shape information, generating decoded VOP data in the units of a macro block.

Figure 16:
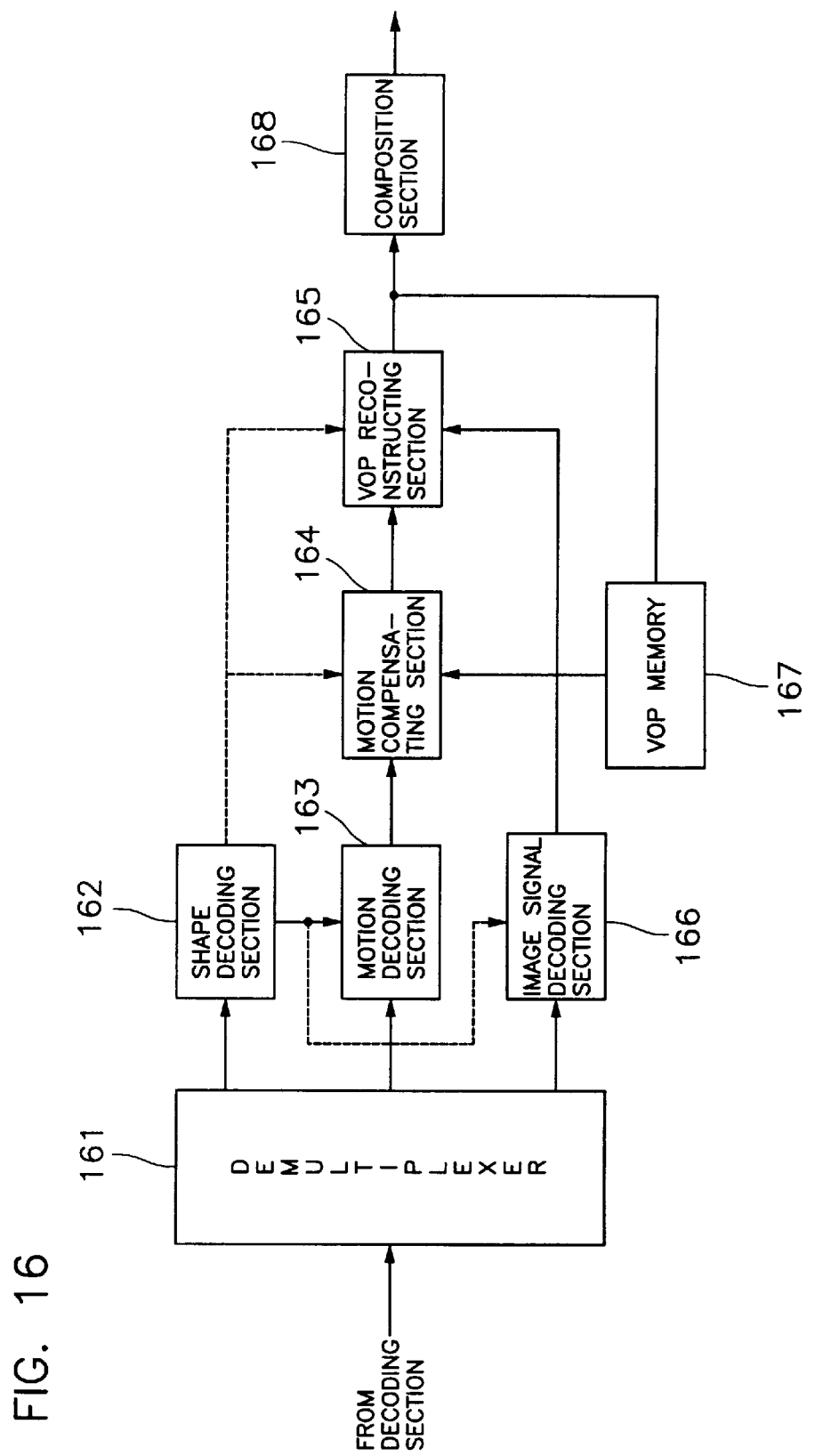
FIG. 16 is a block diagram of a VOP decoder according to the present invention.

FIG. 16 is a block diagram of a VOP decoder in accordance with the present invention.

Referring to FIG. 16, a demultiplexer 161 demultiplexes the multiplexed image information transferred from the VOP coding section, and a shape decoding section 162 decodes the image information generated by the demultiplexer 161. A motion decoding section 163 receives the motion information transferred from the demultiplexer 161 and the shape information from the shape decoding section 162, detecting the motion information. The image information transferred from the demultiplexer 161 and the shape information from the shape decoding section 162 are fed into an image signal decoding section 166, which divides the merged blocks and performs a prediction in order to decode the image signal. A motion compensating section 164 receives the motion information detected by the motion decoding section 163, the shape information generated by the shape decoding section 162, and the VOP data transferred from a VOP memory 167, compensating the motion information. A VOP reconstructing section 165 reconstructs the VOP from the shape information received from the shape decoding section 162, the motion information compensated by the motion compensating section 164, and the image signal decoded by the image signal decoding section 166. A composition section 168 receives the VOP signal from the VOP reconstructing section 165 and composes a picture.

Figure 17:
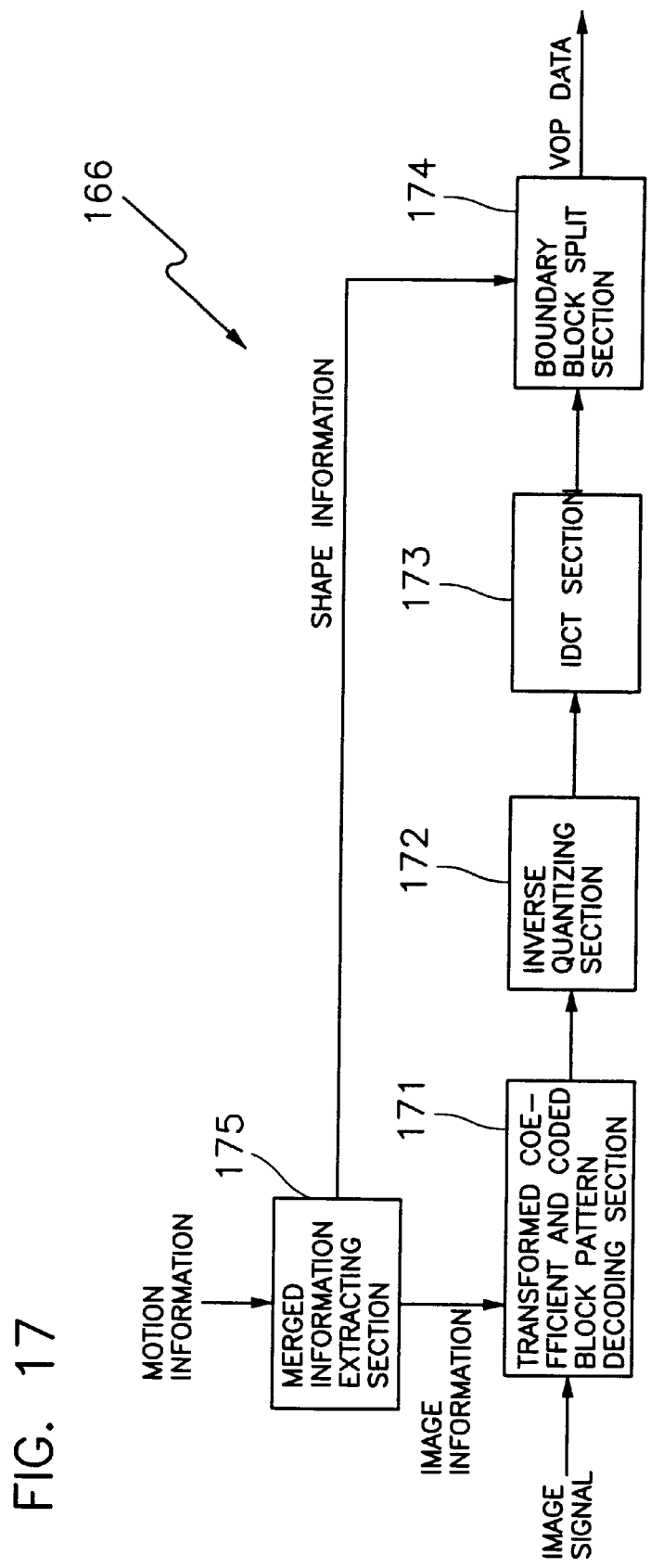
FIG. 17 is a block diagram of an image signal decoding section of a VOP decoder for decoding a coded image information by a boundary block merge and a prediction.

FIG. 17 is a block diagram of the VOP reconstructing section of a VOP decoder for decoding the image information coded by a merge and prediction.

A merged information extracting section 175 receives the shape information from the shape decoding section 162 and extracts merged information in the same manner of the coding section, transmitting them to a transformed coefficient and coded block pattern decoding section 171 and a boundary block split section 174. The transformed coefficient and coded block pattern decoding section 171 receives the merged information from the merged information extracting section 175 and the image signal from the demultiplexer 161, so that it divides the merged blocks and performs a prediction, decoding the coded image information. An inverse quantizing section 172 multiplies the image information decoded by the transformed coefficient and coded block pattern decoding section 171 by the quantized coefficient. An inverse discrete cosine transformer 173 inverse-transforms the inverse-quantized coefficient transferred from the inverse quantizing section 132, generating image data in a space region. A boundary block split section 174 receives the image signal from the inverse discrete cosine transformer 173 and the merged information from the merged information extracting section 175, generating decoded VOP data in the units of a macro block.

The boundary block merge, and DC and AC coefficient prediction are accomplished by the image signal coding sections 84 and 144 in an encoder, and by the image reconstructing section 124 and the VOP reconstructing section 165 in a decoder.

If the transformed coefficient and coded block pattern coding sections 114 and 155 generate texture information, and the merged information generated by the boundary block merging sections 111 and 152 indicate that the current sub block is an exterior sub block converted from a boundary sub block during a merge process, the current sub block is not transformed by the discrete cosine transformers 112 and 153 but the quantized DCT coefficients (DC and AC coefficients) of merged blocks are copied into the current sub block for use in a prediction.

Figure 3:
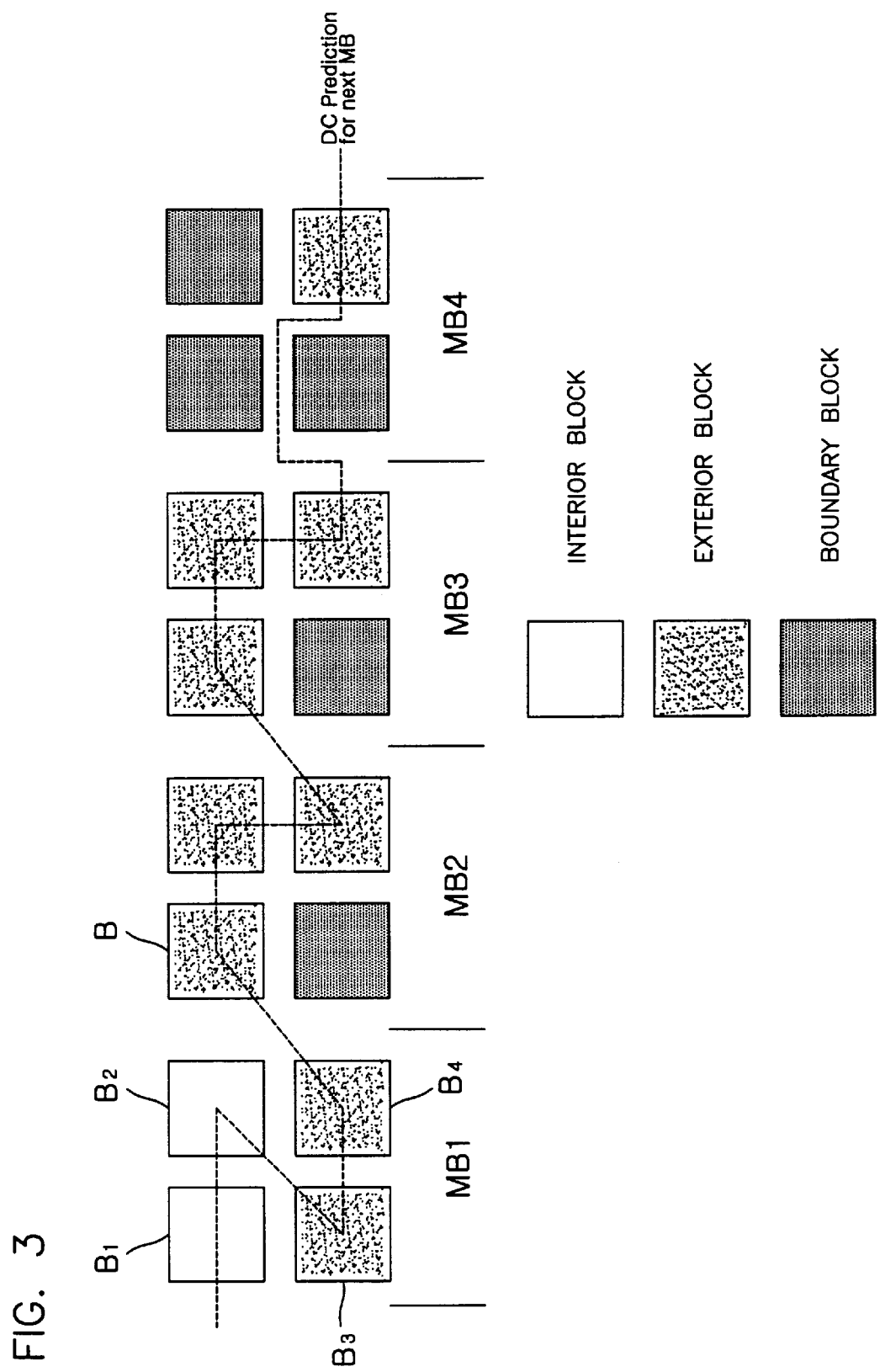
FIG. 3 illustrates a scanning before a boundary block merge.

For example, when the block 4 of the macro block MB2 is converted from a boundary block to an exterior block during a merge process, as shown in FIGS. 3 and 10, the block 2 of the macro block MB2 containing merged information copies DCT coefficients, which are used to predict the block 1 of the macro block MB3.

Figure 4:
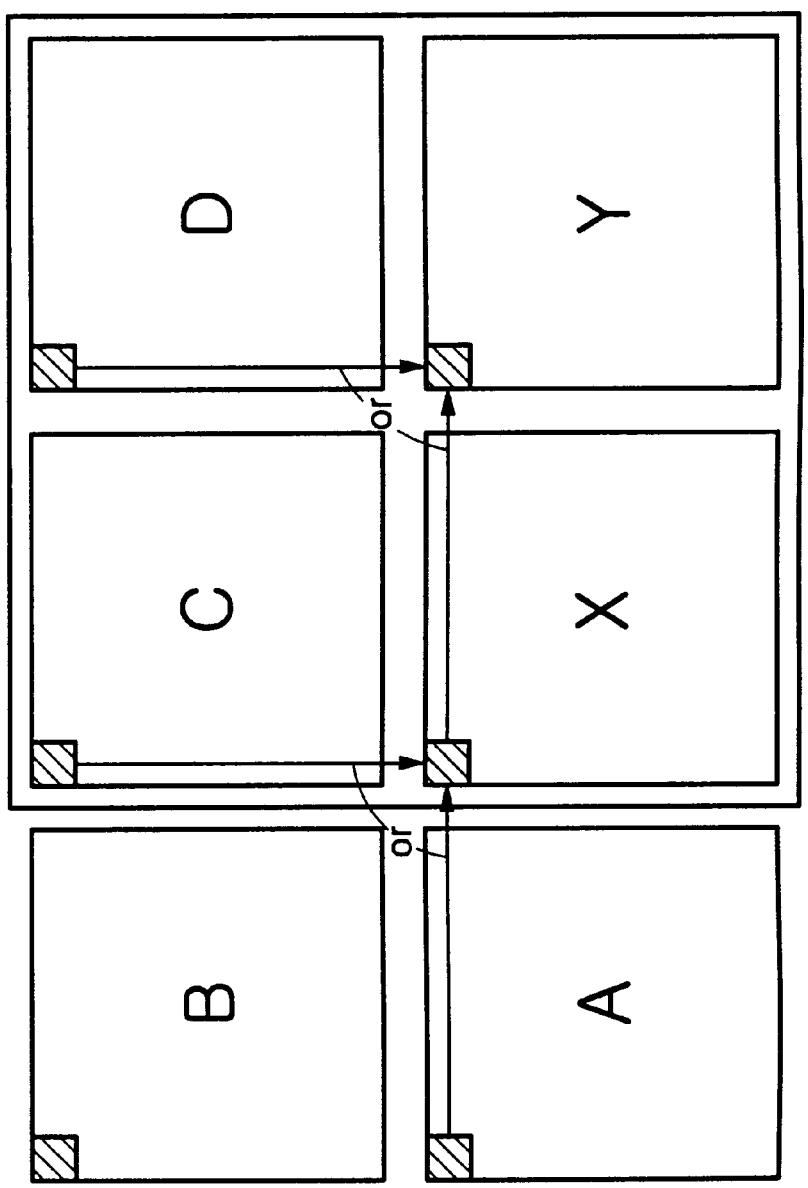
FIG. 4 illustrates a prediction of a DC coefficient.

In FIG. 4, to code the DC coefficient for the current block X by a prediction, the absolute value of the vertical gradient for the DC coefficients of the previous and left upper-sided blocks A and B is compared with that of the horizontal gradient for the DC coefficients of the left upper-sided and upper-sided blocks B and C. If the former is less than the latter, the DC coefficient of the upper-sided block C is defined as a DC pre-estimated value that will be used to code the DC coefficient of the current block X, and if the former is larger than the latter, the DC coefficient of the left-sided block A is used as a DC pre-estimated value for coding the DC coefficient of the current block X.

When the blocks A, B and C used to code the DC coefficient by a prediction are converted from boundary blocks to exterior blocks during a boundary block merge process, the DCT coefficient of the block coded by the boundary block merge is copied into the macro block containing merged information.

Figure 5:
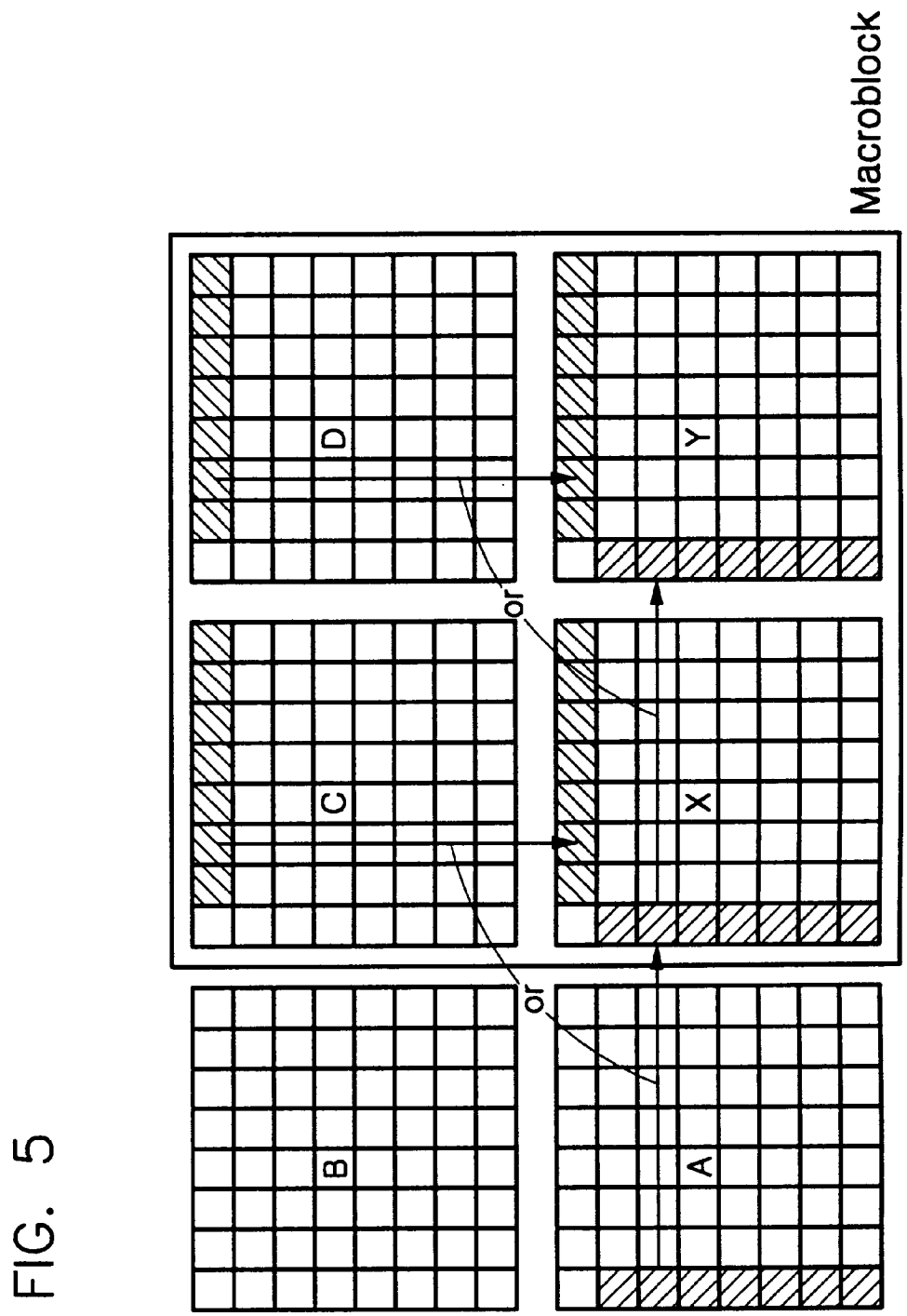
FIG. 5 illustrates a prediction of an AC coefficient.

In FIG. 5, The first row coefficient of the previous block A or the first column coefficient of the upper-sided block C as used to predict the DC coefficient as illustrated in FIG. 4 can be used to predict the first row or column coefficient of the current block X. When the blocks A and C as used in an AC coefficient coding are boundary blocks converted from exterior blocks by a boundary block merge process, the DCT coefficient of the block coded by the boundary block merge is copied into the macro block containing the merged information, which is then used.

Figure 18:
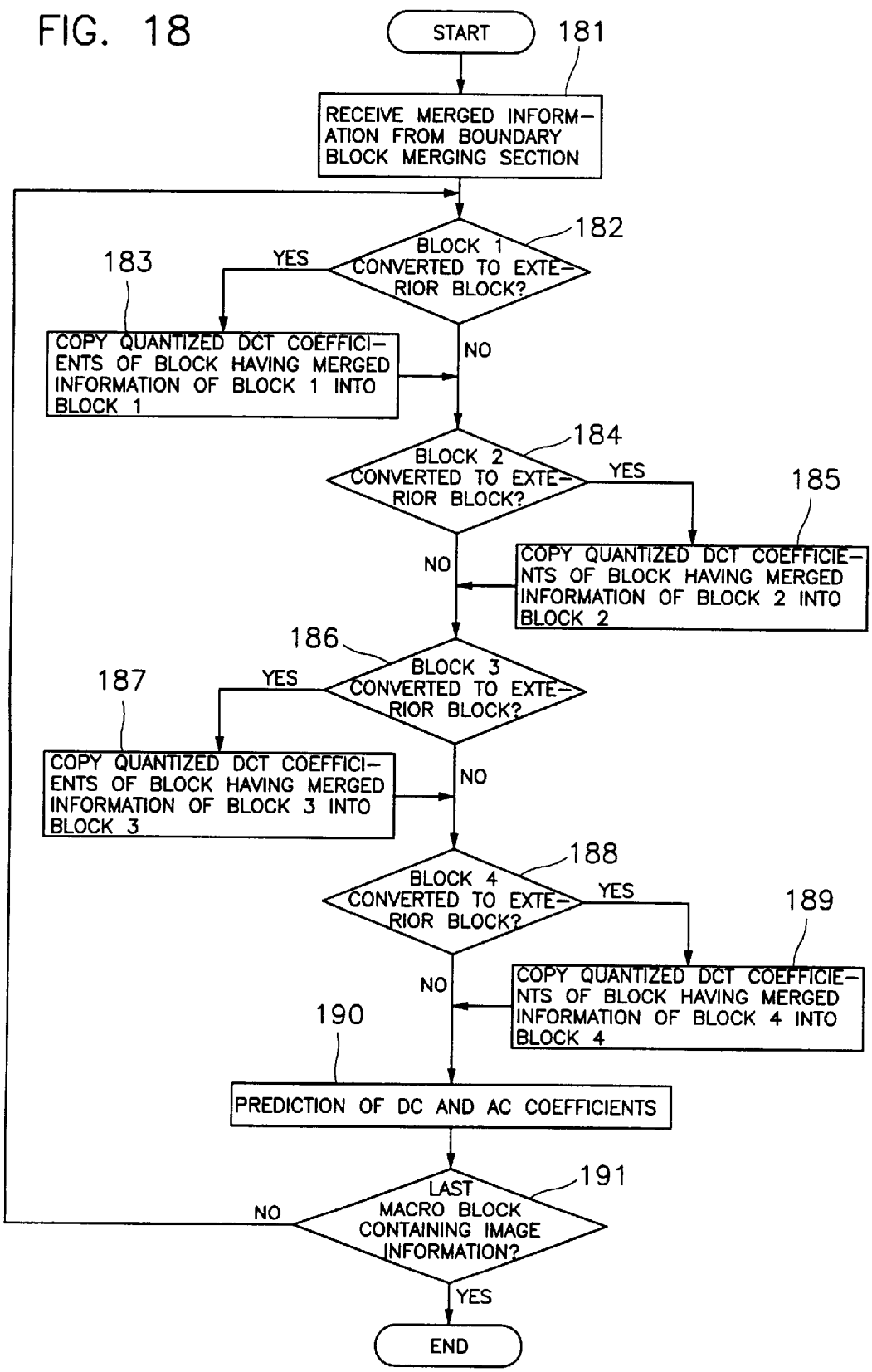
FIG. 18 is a flow diagram illustrating a first embodiment of a method of coding image information by performing predictions after a boundary block merge.

FIG. 18 is a flow diagram illustrating a first embodiment of a coding method by which a prediction is accomplished after a merge process.

Referring to FIG. 18, the boundary block merging section 111 (the image signal coding section 144 of a VOP encoder) constituting the image signal coding section 84 of an encoder receives merged information transferred from the boundary block merging section 152, in step S181. It is determined from the merged information whether block 1 is changed into an exterior block from a boundary one, in step S182. If block 1 is changed into an exterior block from a boundary one, the block coded by merging the information of block 1 is searched for by using the merged information and the quantized DCT coefficient of the block is copied into block 1, in step S183, going to step S184. If not, it also goes to step S184.

It is determined from the merged information whether block 2 is an exterior block converted from a boundary one, in step S184. If block 2 is an exterior block converted from a boundary one, the block coded by merging the information of block 2 is searched for by using the merged information and the quantized DCT coefficient of the block is copied into block 2, in step S185, going to step S186. If not, it also goes to step S186.

It is determined from the merged information whether block 3 is an exterior block converted from a boundary one, in step S186. If block 3 is an exterior block from a boundary one, the block coded by merging the information of block 3 is searched for by using the merged information and the quantized DCT coefficient of the block is copied into block 3, in step S187, going to step S188. If not, it also goes to step S188.

It is determined from the merged information whether block 4 is changed into an exterior block from a boundary one, in step S188. If block 1 is an exterior block changed from a boundary one, the block coded by merging the information of block 4 is searched for by using the merged information and the quantized DCT coefficient of the block is copied into block 4, in step S189, going to step S190. If not, it also goes to step S190.

DC and AC coefficients are predicted, in step 190. It is determined whether the current macro block coded is the last macro block containing image information or not, in step 191. If the current macro block is not the last one, it returns to step 181. If so, the program is ended.

Figure 19:
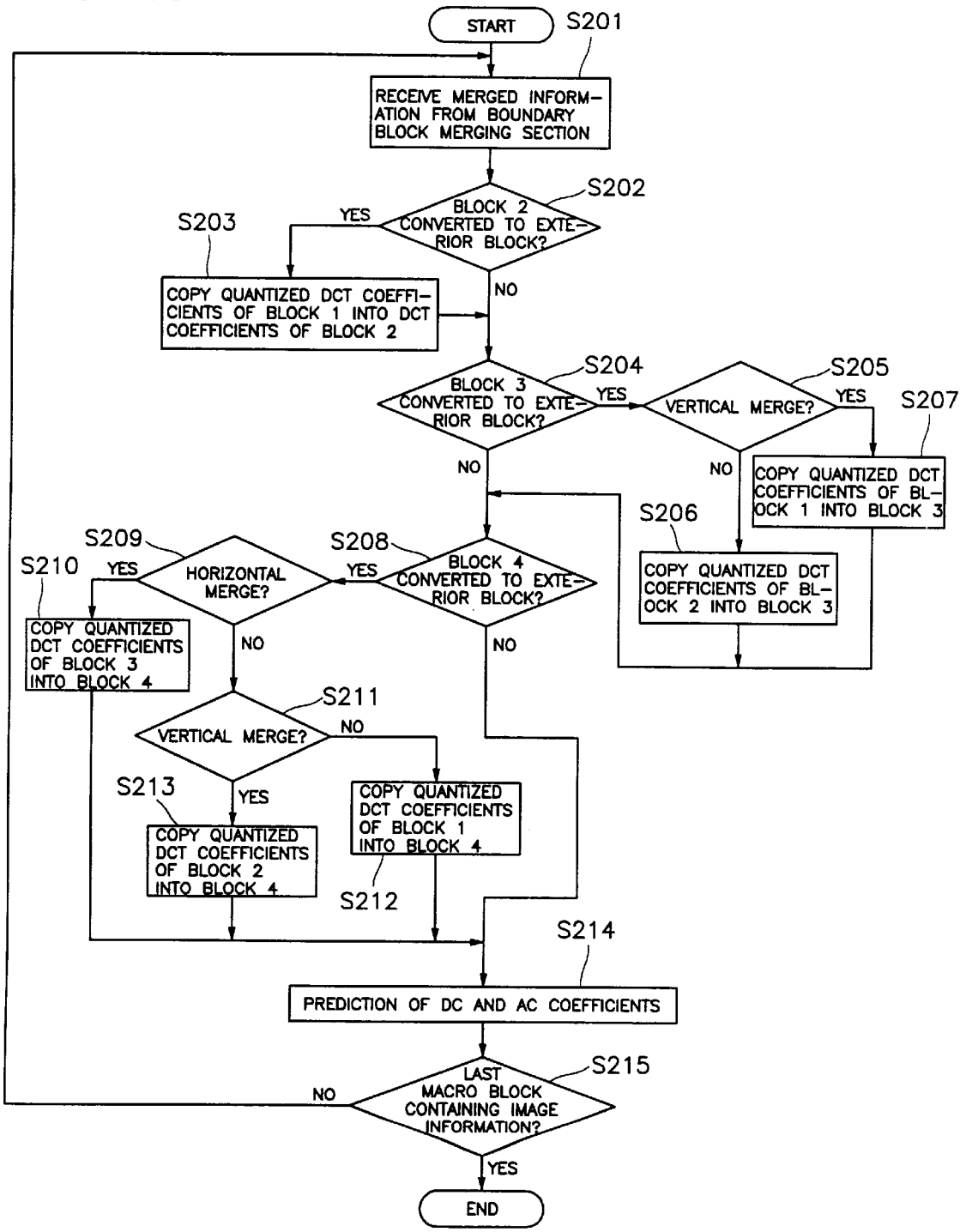
FIG. 19 is a flow diagram illustrating a second embodiment of a method of coding image information by performing predictions after a boundary block merge.

FIG. 19 is a flow diagram illustrating a second embodiment of a coding method by which a prediction is accomplished after a merge process. Block 1, if it is a boundary block, will be excluded in the present method because it cannot be converted into an exterior block by a boundary block merge.

The boundary block merging section 111 (the image signal coding section 144 of a VOP encoder) constituting the image signal coding section 84 of an encoder receives merged information transferred from the boundary block merging section 152, in step S201. It is then determined from the merged information whether block 2 is changed into an exterior block from a boundary one, in step S202. If block 2 is an exterior block converted from a boundary one, the quantized DCT coefficient of the block 1 is copied into the DCT coefficient of the block 2, in step S203, going to step S204.

If block 2 is changed into an exterior block from a boundary one, it is determined from the merged information whether block 3 is changed into an exterior block, in step S204. If block 3 is an exterior block changed from a boundary one, it is determined whether it is a vertical merge, in step 205. If block 3 is changed into an exterior block by a vertical merge, the quantized coefficient of block I is copied into block 3, in step 207, going to step 208. If it is not a vertical merge, the quantized coefficient of block 2 is copied into block 3, going to step 208.

If block 3 is not changed into an exterior block from a boundary one, it is determined from the merged information whether block 4 is converted into an exterior block, in step S208. If block 4 is an exterior block converted from a boundary one, it is determined whether it is a horizontal merge, in step 209. If block 4 became an exterior block by a horizontal merge, the quantized coefficient of block 3 is copied into block 4, in step 210, going to step 214 and predicting DC and AC coefficients.

If it is not a horizontal merge, it is determined whether it is a vertical merge, in step 211. If it is not a vertical merge, the quantized coefficient of block 1 is copied into a block 4, going to step 214. If it is a vertical merge, the quantized coefficient of block 2 is copied into block 4, going to step 214.

DC and AC coefficients are predicted, in step 214. It is determined whether the last macro block is received or not, in step 215. If the current macro block is the last one, it returns to step 201. If not, the program is ended.

A process for predicting the DC and AC coefficients in step S214 can be applied to each block as follows.

First, the boundary block merging section 111 (the image signal coding section 144 of a VOP encoder) constituting the image signal coding section 84 of an encoder receives merged information transferred from the boundary block merging section 152. If determined from the merged information that block 2 is converted into an exterior block from a boundary one, as block 2 is merged only with block 1, the quantized DCT coefficients of block 1 are copied into block 2 for use in an AC/DC predictive coding (in step S214).

Second, when it is determined from the merged information received from the boundary block merging sections 111 and 152 that block 3 is an exterior block converted from a boundary one (in step S204), block 3 searches for the merged block in the procedures below, copying the quantized DCT coefficients of the block for use in a prediction.

(1) From the merged information, it is determined whether block 3 is merged into block 1 by a vertical merge, in step S205. If block 3 is merged into block 1, the quantized DCT coefficients of block 1 are copied into block 3, in step S207.

(2) From the merged information, if it is determined that block 3 is not merged into block 1 in the same manner of process (1) but it is merged into block 2 by a diagonal merge, the quantized DCT coefficients of block 2 are copied into block 3, in step S206.

Third, when it is determined from the merged information that block 4 is an exterior block converted from a boundary one, block 4 searches for the merged block in the procedures below, copying the quantized DCT coefficients of the block for use in a prediction.

(1) From the merged information, it is determined whether block 4 is merged into block 3 by a horizontal merge, in step S. If block 4 is merged into block 3, the quantized DCT coefficients of block 3 are copied into block 4, in step S210.

(2) If block 4 is not merged into block 3 in the same manner of process (1) after a determination from the merged information, it is determined whether block 4 is merged into block 2 by a vertical merge, in step 211. If block 4 is merged into block 2 by a vertical merge, the quantized DCT coefficients of block 2 are copied into block 4, in step S213.

(3) From the merged information, if it is determined that block 4 is not merged into block 3 nor block 2 in the same manner of processes (1) and (2), block 4 is merged into block 1 in a diagonal merge and the quantized DCT coefficients of block 1 are copied into block 4, in step S212.

According to another embodiment, when the transformed coefficient and coded block pattern coding sections 114 and 155 generate texture information, and the merged information generated by the boundary block merging sections 111 and 152 indicate that the current sub block is an exterior block converted from a boundary one, the DC coefficient out of the quantized DCT coefficients of the merged block is copied into the current sub block, while the AC coefficient is set to "0".

In the present embodiment of a method of coding image information, the same processes of S181–S189 as illustrated in FIG. 18 are accomplished with the exception of S190 where the DC coefficient out of the quantized DCT coefficients of the merged block is copied into the current sub block, but the AC coefficient is set to "0".

The present embodiment also uses a method of coding image information as illustrated in FIG. 19, where the same processes are accomplished as in S201–S213 with the exception that the DC coefficient out of the quantized DCT coefficients of the merged block is copied into the current sub block, but the AC coefficient is set to "0", in step S214.

According to another embodiment, as the existing exterior blocks, the DC coefficient is set to $2^{(bits\ per\ pixel-1)}$ and the AC coefficient is to "0".

When a boundary block is converted to an exterior block by a boundary block merge, the block is not DCT-coded together with the existing exterior blocks, but DC component is set to $2^{(bits\ per\ pixel-1)}$ and AC component is to "0". The present embodiment uses a method of coding image information as illustrated in FIGS. 18 and 19 where the same processes of S181–S189 and S202–S213 are accomplished with exception of S190 and S214.

According to another embodiment, if the merged information indicates that the current sub block is converted to an exterior block from a boundary one by a boundary block merge, the block is not DCT-coded together with the exterior block but the AC and DC coefficients of a block, which is not an exterior block out of the left-sided and upper-sided blocks, is copied into the current sub block. The present embodiment uses a method of coding image information as illustrated in FIGS. 18 and 19, where the same processes of S181–S189 and S202–S213 are accomplished with exception that the prediction of S190 and S214 is performed as above. The same processes in FIGS. 18 and 19 are accomplished to perform a decoding method after the block converted to an exterior block from a boundary one during a boundary block merge is searched for by means of the merged information transferred from the merged information extracting section 175.

Figure 20:
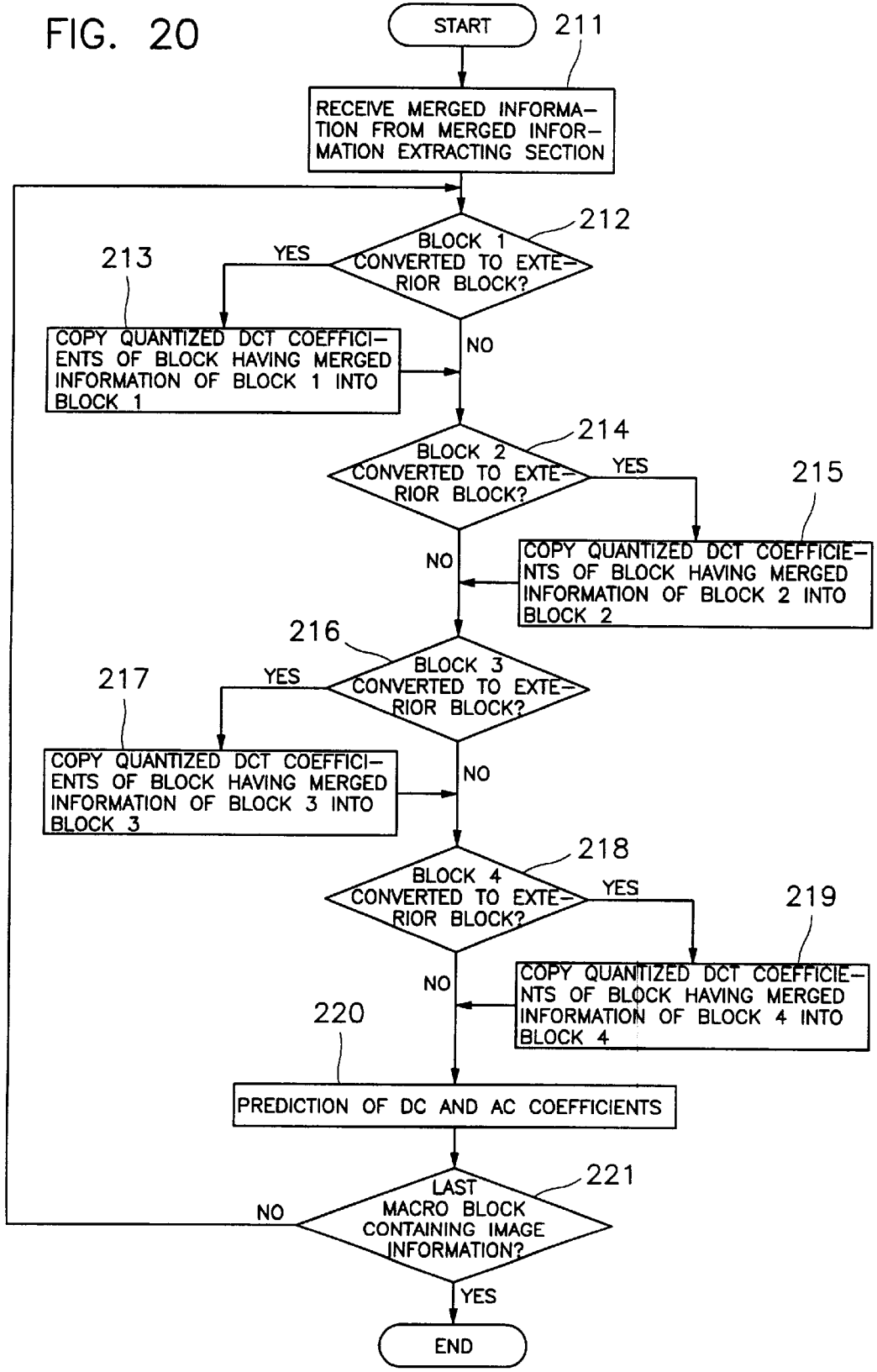
FIG. 20 is a flow diagram illustrating a first embodiment of a method of decoding image information by performing predictions after a boundary block merge.
Figure 21:
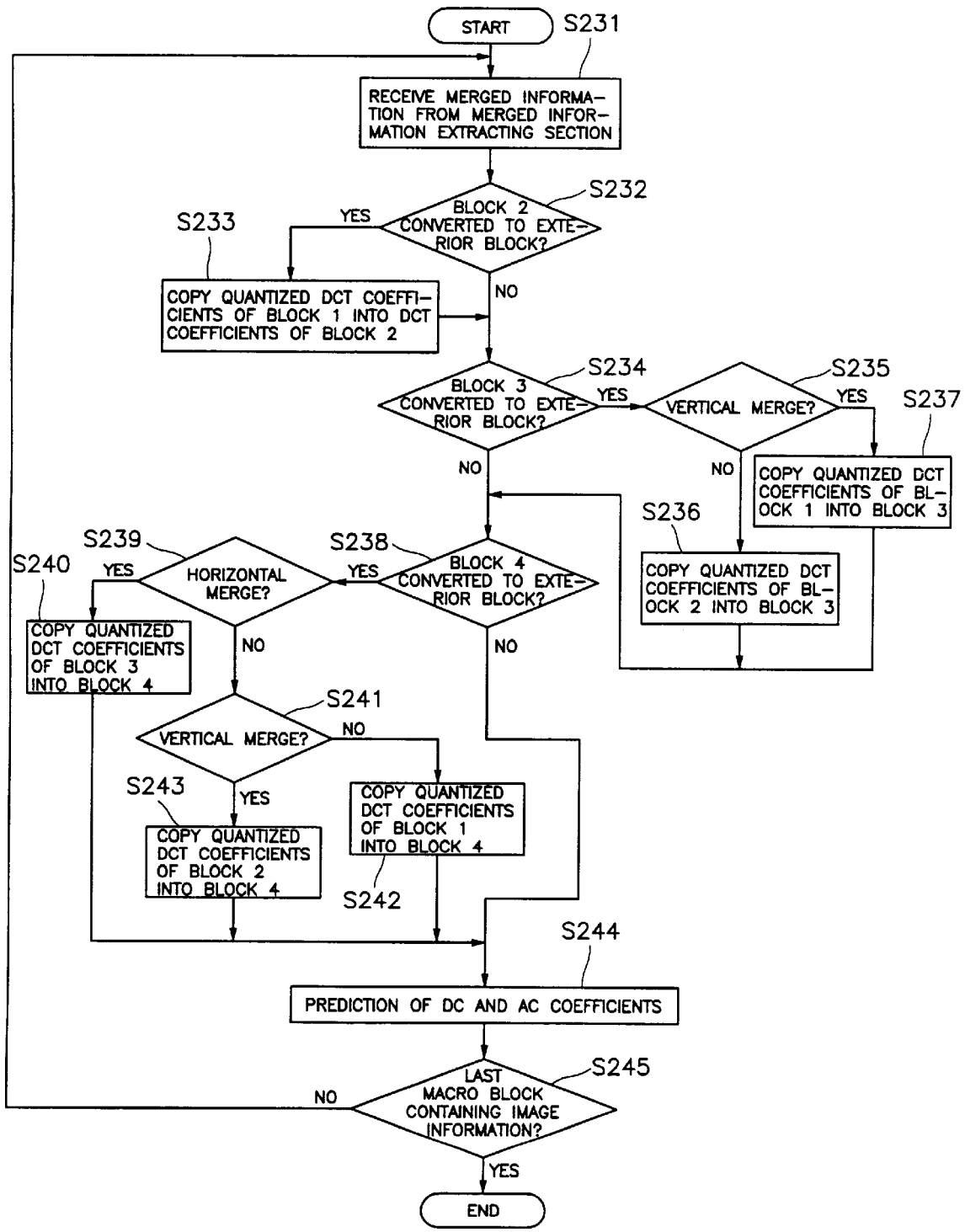
FIG. 21 is a flow diagram illustrating a second embodiment of a method of decoding image information by performing predictions after a boundary block merge.

FIGS. 20 and 21 are flow diagrams illustrating embodiments of a method of decoding image information by performing predictions after a boundary block merge.

As described above, the present invention efficiently processes the blocks that are converted to exterior blocks from boundary ones when a boundary block merge is used in an image coder/decoder, and by this process the coding/decoding efficiency can be greatly enhanced.

It will be apparent to those skilled in the art that various modifications and variations can be made in a device for coding/decoding image information according to the present invention without departing from the spirit or scope of the invention. Thus, it is intended that the present invention cover the modifications and variations of this invention provided they come within the scope of the appended claims and their equivalents.

What is claimed is:

1. A device for coding information, comprising:

a motion estimating section for receiving an object image signal to estimate motion in the units of a macro block, said object image signal comprising a plurality of macro blocks, said macro blocks comprising a plurality of pixels, said motion estimation section outputting motion information of a macro block;

a motion compensating section, said motion compensating section receiving said motion information, said motion compensating section compensating the motion information of the macro block, wherein said motion compensating section outputs a motion compensated macro block unit;

a subtractor, said subtractor receiving said object image signal and said motion compensated macro block, said subtractor detecting the difference between said motion compensated macro block and said object, image signal;

an image signal coding section, said object image signal coding section receiving the output of the subtractor, said image coding section dividing said macro blocks into a plurality of interior sub blocks, exterior sub blocks, and boundary sub blocks, said object image signal coding section comparing pixel values corresponding to respective blocks so as to determine whether a block received is a boundary block, and performing a boundary block merge;

an adder, said adder receiving the output of said image coding section, and said motion compensated macro block unit, said adder detecting the sum of the output of said image coding section and said motion compensated macro block unit;

a previous image detecting section for detecting the previous image signal from the output of the adder, and generating it to the motion estimating section and the motion compensating section;

a multiplexer, said multiplexer receiving the output of said image coding section, and said motion information of said macro block, said multiplexer for multiplexing the output of said image of said image signal coding section and said motion information of said macro block; and a buffer, said buffer receiving the output of said multiplexer, and transmitting said output of said multiplexer.

2. The device as defined in claim 1, wherein the image signal coding section comprises:

a boundary block merging section for receiving the object image signal, comparing pixel values corresponding to respective blocks so as to determine whether the block received is a boundary block, and performing a boundary block merge; said boundary block merging section outputting a merged image signal;

a discrete cosine transformer, said discrete cosine transformer receiving said merged image signal, said discrete cosine transformer for performing a discrete cosine transformation of said merged image signal, said discrete cosine transformer outputting a transformed coefficient signal;

a quantizing section, said quantizing section receiving said transformed coefficient signal, said quantizing section for quantizing the transformed coefficient signal received from the discrete cosine transformer, said quantizing section outputting a quantized transformed coefficient signal;

a transformed coefficient and coded block pattern coding section for receiving the quantized transformed coefficient signal from the quantizing section and the merged image signal from the boundary block merging section, said transformed coefficient and coded block pattern comparing pixel values corresponding to the respective blocks, and selectively generating texture information;

an inverse quantizing section, said inverse quantizing section receiving said quantized transformed coefficient signal, said inverse quantizing section inverse-quantizing the quantized transformed coefficient signal and extracting the transformed coefficient signal;

an inverse discrete cosine transformer, said inverse discrete cosine transformer receiving said extracted coefficient signal, said inverse discrete cosine transformer performing an inverse discrete cosine transformation of the extracted transformed coefficient; and a boundary block split section for receiving the image signal from the inverse discrete cosine transformer and the merged information from the boundary block merging section, and generating decoded data.

3. The device as defined in claim 1, wherein the image signal coding section comprises:

a macro block scanning section for scanning the macro blocks in the units of a sub block;

a sub block merging section, said sub block merging section comprising a plurality of requirements for merging sub blocks, said sub block merging section merging the sub blocks scanned by the macro block scanning section when the sub blocks meet said requirements for a merge; and a texture-based image coding section for coding the blocks merged by the sub block merging section.

4. The device as defined in claim 1, wherein the image coding section comprises means for coding the object image signal by performing a merge over a frame image without restriction on the macro block, said image signal coding section further comprising:

a frame image merging section for merging frame images; and a texture-based image coding section for coding the image signal merged by the frame image merging section.

5. The device as defined in claim 3, wherein the macro block scanning section stores profile information of an object image by dividing the macro block into blocks 1 to 4 and scanning respective sub blocks, and the sub block merging section searches for boundary blocks and compares the profile information of coordinates corresponding to respective boundary blocks, performing a merge.

6. The device as defined in claim 3, wherein if there is no pixel overlapped between a first boundary block rotated in a 180-degree arc and a second boundary block, said first boundary block is merged into said second boundary block, and coded.

7. A device for decoding image information, said image information comprising a plurality of macro blocks, said macro blocks comprising a plurality of interior sub blocks, exterior sub blocks, and boundary sub blocks, said macro blocks further comprising a plurality of pixels, said device comprising:

a demultiplexer for demultiplexing image and motion information transferred from a coding section;

a motion decoding section for detecting the motion information from the output of the demultiplexer;

an image signal decoding section for receiving the image information from the demultiplexer, comparing pixel values corresponding to respective blocks, and performing a boundary block division and a decoding, said image signal decoding section outputting image and motion information;

a motion compensating section for receiving the image and motion information detected by the motion decoding section, said motion compensating section compensating said motion information for outputting motion compensated information;

an image reconstructing section for receiving the motion-compensated information from the motion compensating section, and reconstructing an image; and an image memory for storing and generating the image reconstructed by the image reconstructing section.

8. The device as defined in claim 7, wherein the image signal decoding section comprises:

a transformed coefficient and coded block pattern decoding section for receiving the image information from the demultiplexer, comparing pixel values corresponding to respective blocks so as to determine whether the block received is a boundary block, and performing a boundary block division and a prediction to decode the image information;

an inverse quantizing section for multiplying the image information, decoded by the transformed coefficient and coded block pattern decoding section, by a quantized coefficient, said inverse quantizing section outputting a transformed coefficient;

an inverse discrete cosine transformer for performing an inverse discrete cosine transformation of the transformed coefficient inverse-quantized by the inverse quantizing section, and generating said transformed coefficient as image data in a space region; and a boundary block split section for receiving the image signal from the inverse discrete cosine transformer, and generating image data in the units of a macro block.

9. A device for coding image information, which is an image encoder for splitting an image into object and background images that have predetermined shape information, said device comprising:

a Video Object Plane (VOP) definition section for receiving an image signal, and defining a VOP;

a motion estimating section for receiving the image signal in macro block units from the VOP definition section, said said macro blocks comprising a plurality of pixels, said motion estimating section estimating a motion and outputting motion information;

a motion compensating section for receiving said motion information from the motion estimating section, and compensating the motion information, said motion compensating section outputting a motion compensated VOP;

a subtractor for detecting the difference between the motion-compensated VOP from the motion compensating section and the defined VOP from the VOP definition section;

an image signal coding section for receiving the output of the subtractor and the predetermined shape information, said image signal coding section dividing said macro blocks into interior sub blocks, exterior sub blocks and boundary blocks, merging macro blocks by performing a boundary block merge, and coding the merged macro blocks in the units of a sub block, said image signal coding section outputting interior information;

an adder for detecting the sum of the motion compensated VOP motion-compensated by the motion compensating section and interior information coded by the image signal coding section;

a previous VOP detecting section for detecting the previous VOP from the output of the adder, and generating it to the motion estimating section and the motion compensating section;

a shape coding section for receiving the image in macro block unit from the VOP definition section, and coding the shape information;

a multiplexer for multiplexing the motion information estimated by the motion estimating section, the interior information coded by the image signal coding section, and the shape information coded by the shape coding section; and a buffer for transmitting the output of the multiplexer as a bit stream.

10. The device as defined in claim 9, wherein the output signal of the shape coding section is transferred into the motion estimating section, the motion compensating section, and the image signal coding section, said output signal being used in estimating the motion, compensating the motion, and coding the interior information.

11. The device as defined in claim 9, wherein the image signal coding section comprises:

a macro block scanning section for scanning the macro blocks in the units of a sub block;

a sub block merging section, said sub block merging section comprising a plurality of requirements for merging sub blocks, said sub block merging section merging the sub blocks scanned by the macro block scanning section when the sub blocks meet said requirements for a merge; and a texture-based image coding section for coding the blocks merged by the sub block merging section.

12. The device as defined in claim 9, wherein the image signal coding section comprises means for coding the image signal by performing a merge over a frame image without restriction on a macro block said image coding section further comprising:

a frame image merging section for merging frame images, said frame image merging section outputting an image signal; and a texture-based image coding section for coding the image signal merged by the frame image merging section.

13. The device as defined in claim 9, wherein said sub blocks further comprise a background part and an object part, and the image signal coding section comprises:

a boundary block padding section for receiving the image signal and the original shape information, and replacing the background part of the sub blocks with the mean value of the object part, said boundary block padding section outputting reconstructed shape information;

a boundary block merging section for receiving the image signal and the reconstructed shape information from the boundary block padding section, and performing a boundary block merge, said boundary block merging section outputting a merged image signal;

a discrete cosine transformer for performing a discrete cosine transformation of the merged image signal received from the boundary block merging section, said discrete cosine transformer outputting a transformed coefficient, wherein said transformed coefficient comprises DC and AC coefficients;

a quantizing section for quantizing the transformed coefficient received from the discrete cosine transformer, said quantizing section outputting a quantized transformed coefficient;

a transformed coefficient and coded block pattern coding section for receiving the quantized transformed coefficient quantized by the quantizing section and merged image signal transferred from the boundary block merging section, and selectively coding texture information;

an inverse quantizing section for inverse-quantizing the quantized transformed coefficient quantized by the quantizing section, and extracting a transformed coefficient;

an inverse discrete cosine transformer for performing an inverse discrete cosine transformation of the transformed coefficient received from the inverse quantizing section; and a boundary block split section for receiving the image signal from the inverse discrete cosine transformer and the reconstructed shape information, and generating decoded data.

14. The device as defined in claim 13, wherein when the transformed coefficient and coded block pattern coding section generates texture information and the merged image signal generated by the boundary block merging section indicates that a current sub block is an exterior sub block converted from a boundary sub block by a boundary block merge, the quantized DC and AC coefficients of the merged blocks are copied into the current sub block.

15. The device as defined in claim 13, wherein when the transformed coefficient and coded block pattern coding section generates texture information, and the merged image signal indicates that a current sub block is an exterior sub block converted from a boundary sub block by a boundary block merge, the DC coefficient is set to $2^{(bits\ per\ pixel-1)}$ where bits per pixel is the number of bits indicating the pulse code modulation data of one pixel, and the AC coefficient is set to 0.

16. The device as defined in claim 13, wherein when the transformed coefficient and coded block pattern coding section generates texture information, and the merged image signal indicates that a current sub block is an exterior sub block converted from a boundary sub block by a boundary block merge, a prediction is performed by copying the AC and DC coefficients of a first block, wherein said first block is not an exterior block, out of left-sided and upper-sided blocks, into the current sub block.

17. The device as defined in claim 13, wherein when the transformed coefficient and coded block pattern coding section generates texture information, and the merged image signal indicates that a current sub block is an exterior sub block converted from a boundary sub block by a boundary block merge, a prediction is performed by copying the quantized DC coefficient of the merged block into the current sub block and setting the AC coefficient to 0.

18. The device as defined in claim 13, wherein when the transformed coefficient and coded block pattern coding section generates texture information, and the merged image signal indicates that a current sub block is an exterior sub block converted from a boundary sub block by a boundary block merge, a prediction is performed by copying the quantized AC and DC coefficients of the merged block into the current sub block.

19. A device for decoding image information, wherein said image information comprises video object plane (VOP) data, a plurality of macro blocks, said macro blocks comprising a plurality of interior sub blocks, exterior sub blocks, and boundary sub blocks, said macro blocks further comprising a plurality of pixels, said device being an image decoder for splitting a coded image into object and background images that have predetermined shape information and comprising:

a demultiplexer for demultiplexing the image information received, said demultiplexer outputting image information;

a shape decoding section for decoding the image information transferred from the demultiplexer, said shape decoding section outputting shape information;

a motion decoding section for detecting motion information from the output of the demultiplexer;

an image signal decoding section for decoding the image information transferred from the demultiplexer to generate a decoded image signal;

a motion compensating section for receiving the motion information detected by the motion decoding section, the decoded shape information decoded by the shape decoding section, and the VOP data so as to compensate a motion, said motion-compensating section outputting motion compensated information; and a VOP reconstructing section for receiving the motion information decoded by the motion decoding section, the motion-compensated information from the motion compensating section, and the decoded image signal decoded by the image signal decoding section, dividing merged blocks from said signals, performing a prediction, and reconstructing a VOP.

20. The device as defined in claim 19, wherein the VOP reconstructing section comprises:

a merged information extracting section for receiving the shape information decoded by the shape decoding section, and extracting merged information by a boundary block merge;

a transformed coefficient and coded block pattern decoding section for receiving the merged information from the merged information extracting section, the motion-compensated information from the motion compensating section, and the image signal from the decoded image signal decoding section, and decoding the coded image information, said transformed coefficient and coded block pattern decoding section outputting image information, and selectively generating texture information;

an inverse quantizing section for multiplying the image information, decoded by the transformed coefficient and coded block pattern decoding section, by the quantized coefficient, said inverse quantizing section outputting a transformed coefficient, wherein said transformed coefficient comprises both DC and AC coefficients;

an inverse discrete cosine transformer for performing an inverse discrete cosine transformation of the transformed coefficient inverse-quantized by the inverse quantizing section, and generating said transformed coefficient as an image signal in a space region; and a boundary block split section for receiving the image signal from the inverse discrete cosine transformer and the shape information from the shape decoding section, and generating decoded VOP data in the units of a macro block.

21. The device as defined in claim 19, wherein if the transformed coefficient and coded block pattern coding section generates texture information, and the merged information indicates that the current sub block is an exterior sub block converted from a boundary sub block by a boundary block merge, the DC coefficient is set to $2^{(bits\ per\ pixel-1)}$ where bits per pixel is the number of bits indicating the pulse code modulation data of one pixel, and the AC coefficient is set to 0.

22. The device as defined in claim 19, wherein if the transformed coefficient and coded block pattern coding section generates texture information, and the merged information indicates that the current sub block is an exterior sub block converted from a boundary sub block by a boundary block merge, a prediction is performed by copying the AC and DC coefficients of a block, which is not an exterior block out of left-sided and upper-sided blocks, into the current sub block.

23. The device as defined in claim 19, wherein when the transformed coefficient and coded block pattern coding section generates texture information, and the merged information indicates that a current sub block is an exterior sub block converted from a boundary sub block by a boundary block merge, a prediction is performed by copying the quantized DC coefficient of merged block into the current sub block and setting the AC coefficient to 0.

24. The device as defined in claim 19, wherein if the transformed coefficient and coded block pattern coding section generates texture information, and the merged information indicates that the current sub block is an exterior sub block converted from a boundary sub block by a boundary block merge, a prediction is performed by copying the quantized AC and DC coefficients of the merged block into the current sub block.

* * * * *